United States Patent
Hussain et al.

(10) Patent No.: US 7,613,813 B2
(45) Date of Patent: Nov. 3, 2009

(54) METHOD AND APPARATUS FOR REDUCING HOST OVERHEAD IN A SOCKET SERVER IMPLEMENTATION

(75) Inventors: Muhammad R. Hussain, Pleasanton, CA (US); Richard E. Kessler, Shrewsbury, MA (US); Faisal Masood, Cupertino, CA (US); Robert A. Sanzone, Hudson, MA (US); Imran Badr, Fremont, CA (US)

(73) Assignee: Cavium Networks, Inc., Mountain View, CA (US)

( * ) Notice: Subject to any disclaimer, the term of this patent is extended or adjusted under 35 U.S.C. 154(b) by 708 days.

(21) Appl. No.: 11/225,373

(22) Filed: Sep. 12, 2005

(65) Prior Publication Data

US 2006/0075119 A1    Apr. 6, 2006

Related U.S. Application Data

(60) Provisional application No. 60/669,742, filed on Apr. 8, 2005, provisional application No. 60/609,211, filed on Sep. 10, 2004.

(51) Int. Cl.
*G06F 15/16* (2006.01)
(52) U.S. Cl. .................. 709/227; 709/203; 709/221; 709/253; 709/238; 709/250; 370/386; 710/105; 710/8; 710/305; 710/315; 710/316
(58) Field of Classification Search ................ 709/237, 709/203, 230, 217, 204, 318; 710/105, 8, 710/305, 315, 316, 260
See application file for complete search history.

(56) References Cited

U.S. PATENT DOCUMENTS

| 7,421,505 B2* | 9/2008 | Berg .......................... 709/230 |
| 2003/0097401 A1* | 5/2003 | Bauman et al. ............. 709/203 |

OTHER PUBLICATIONS

Pinkerton, J., "The Case for RDMA," Paper presented at RDMA Consortium, (May 2002).
Wang, B. and Singh, S., "Computational Energy Cost of TCP," IEEE INFOCOM, pp. 11 (2004).
Westrelin, R., et al., "Studying Network Protocol Offload With Emulation: Approach and Preliminary Results," pp. 7 No date given.

(Continued)

*Primary Examiner*—Jude J Jean Gilles
(74) *Attorney, Agent, or Firm*—Hamilton, Brook, Smith & Reynolds, P.C.

(57) ABSTRACT

A network application executing on a host system provides a list of application buffers in host memory stored in a queue to a network services processor coupled to the host system. The application buffers are used for storing data transferred on a socket established between the network application and a remote network application executing in a remote host system. Using the application buffers, data received by the network services processor over the network is transferred between the network services processor and the application buffers. After the transfer, a completion notification is written to one of the two control queues in the host system. The completion notification includes the size of the data transferred and an identifier associated with the socket. The identifier identifies a thread associated with the transferred data and the location of the data in the host system.

13 Claims, 16 Drawing Sheets

OTHER PUBLICATIONS

Rangarajan, M., et al., "TCP Servers: Offloading TCP Processing in Internet Servers. Design, Implementation, and Performance," pp. 1-14 No date given.

Romanow, A. and Bailey, S., "An Overview of RDMA over IP," pp. 1-22 No date given.

Callaghan, B., "NFS over RDMA," pp. 1-4 (Jan. 2002).

Bailey, S. And Talpey, T., The Architecture of Direct Data Placement (DDP) and Remote Direct Memory Access (RDMA) on Internet Protocols, pp. 1-20 (Apr. 2005). http://www.ietf.org/internet-drafts-ietf-rddp-arch-06.txt (Feb. 2005).

"iSCSI Controller," pp. 2 (Sep. 2003).

"Ethernet RDMA Technologies," *Technology Brief*, pp. 1-10 (Oct. 2003).

Peng, G., et al., "A Case for Network-Centric Buffer Cache Organization," pp. 1-6 No date given.

\* cited by examiner

| 680 |
|---|
| Domain 640 |
| Type 642 |
| Protocol 644 |
| Bind Address 646 |
| Bind Address Length 648 |
| Which Stack 650 |
| APP FD 652 |
| Stack FD 654 |
| Socket FD 656 |

FIG. 6C

| 690 |
|---|
| DDOQ ID 652 |
| DDOQ Type 660 |
| Network Services Processor ID 662 |
| Number of List Entries 664 |
| List Head 666 |
| Accept or Receive Flags 668 |
| Socket Flags 670 |
| Operation Flags 672 |

FIG. 6D

METHOD AND APPARATUS FOR REDUCING HOST OVERHEAD IN A SOCKET SERVER IMPLEMENTATION

RELATED APPLICATIONS

This application claims the benefit of U.S. Provisional Application No. 60/669,742, filed on Apr. 8, 2005 and 60/609,211, filed on Sep. 10, 2004. The entire teachings of the above applications are incorporated herein by reference.

BACKGROUND OF THE INVENTION

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP) and User Datagram Protocol (UDP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

A socket interface such as the Berkley Socket (BSD) socket interface is a standard Application Programming Interface (API) that includes a set of functions that can be called by networking applications such as web browsers to provide networking services. The application calls an API function which makes a system call to the operating system. The socket interface provides the service requested by the system call by calling low-level functions in the operating system that handle the networking protocol. The underlying protocols and network mechanisms are hidden from the application.

The BSD socket interface is typically used to interface to the TCP/IP protocol stack. TCP/IP is based on a client/server model in which client and server processes identified by network endpoints (IP address and port number) are represented as sockets. A socket is set up between a client process and a server process for a particular domain and network protocol for example, UDP or TCP. The server process is identified by binding an IP address and port number to the socket. After the server process is bound to the socket, the socket can be used to listen for new connection requests and to service them. All requests through the socket interface are directed through an TCP/IP network stack in the operating system (kernel) and involve multiple copies of packet data. Packet data for each connection is copied between a device driver buffer in the kernel and application (user) space, that is, data is first copied to the network stack in kernel memory and must then be copied to buffers in application (user) space before it can be used by the application.

The transfer of packet data for the connection can involve transferring the data over a bus such as the PCI bus. Typically, the transfer is performed by a Direct Memory Access (DMA) engine in a PCI interface. In a host-based descriptor ring DMA engine, descriptors are fetched from host PCI shared memory and data to be transferred over the PCI bus is transferred to buffers identified by pointers stored in the descriptors.

There are different mechanisms to communicate from the host to the DMA engine about the availability of buffers and size of buffers. Also, DMA engines have different ways to communicate to the host about data transfer completion (one such mechanism can be coalesced interrupt). In such a mechanism, there is only one program on the host side that can manage buffers in the descriptor ring and all buffers are treated the same, that is, data is stored in the next available buffer in the ring irrespective of the connection they belong to. Generally, a driver in the kernel manages such descriptor rings. Most generic network interface cards (NICs) support this type of a DMA engine.

In a memory to memory data mover DMA engine, the DMA engine can transfer data across the PCI bus within shared PCI memory space. The transmit side of the PCI bus provides data buffer pointers from where data should be gathered and a list of pointers (typically provided by the receive side) where it must be written on the other side of the PCI bus.

Typically, there are thousands to a million TCP connections established concurrently in a high end server. If a standard DMA engine is used to move the data, applications running on the host that are using the TCP connection sleep waiting for data on their corresponding TCP connection. There can be thousands of such application program threads. When data arrives, the kernel running on the host is interrupted, the kernel finds which sleeping process the received data belongs to by walking a long list of sleeping processes and then the kernel wakes up the process after copying the data to application space in host memory. Finding the appropriate process and copying data is very expensive.

As network transfer speeds increase above 1 Giga bits per second (1 Gb/s) and more data is transferred over the network, the CPU bandwidth required to process the multiple copies of the data increases. The overhead for copying reduces the available memory bus bandwidth and adds latency to when the data is available for use by the application.

SUMMARY OF THE INVENTION

Remote Direct Memory Access (RDMA) eliminates the need for copying received user data between the network protocol stack in kernel space and application buffers in application space in host memory. RDMA avoids this copy by allowing the sender to identify data to be placed directly into application buffers (buffers in user space) and transmitting the identification with the data so that the receiver of the data can place the data directly into the application buffers when it is received.

However, RDMA requires the addition of RDMA support in the network interface card (NIC), and also requires modifications to the application in order to use RDMA.

The present approach provides a network services processor that includes direct DMA to/from a host system application user space which improves host performance in a non-RDMA capable host system and allows the ability to handle a large number of concurrent TCP connections and high data throughput.

A network processor includes local memory and an interface to a host system. The local memory is shared by a plurality of processors for storing data transferred over a network coupled to the network processor. The interface to the host system manages a queue for a socket established between an application executing in host memory and another application executing in a remote host coupled to the network.

The queue stores a unique identifier for a process identifier associated with the socket. The interface transfers data asynchronously between host memory and local memory and an indication is received by a waiting process in the host system that data has been written to host memory based on a process identifier stored in the queue.

The socket may be a Transmission Control Protocol socket or a User Datagram Protocol socket. Furthermore, processing bandwidth is reduced by the need to copy the data from kernel space to application space in host memory. In order to reduce the overhead, the present invention provides a mechanism for direct data placement through the use of a virtual queue. Data transferred over the network may be transferred directly between local memory and application space in host memory in the host system or may be indirectly transferred between local memory and application memory in host memory in the host system via kernel space in the host memory.

The queue may be implemented as a ring buffer and address pointers for managing the queue are stored in local memory.

A network processor includes a plurality of processors and a local memory shared by the plurality of processors. A first processor or group of processors execute an application and a second processor executes an operating system. The local memory stores data transferred over a network coupled to the network processor. The second processor manages a queue for a socket established between the application and another application executing in a remote host coupled to the network. The queue stores a unique identifier for the socket and the data is transferred directly between the application buffers and network buffers in the local memory.

A networking system includes a host system executing a network application. The host system includes a network services processor, a network interface and a socket switch. The socket switch directs network service calls from the application to the network services processor or the network interface card based on an Internet Protocol address included in a network service call.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 6A-D illustrate the format of structures stored in host memory for implementing a plurality of connections;

DETAILED DESCRIPTION OF THE INVENTION

A description of preferred embodiments of the invention follows.

Figure 1:
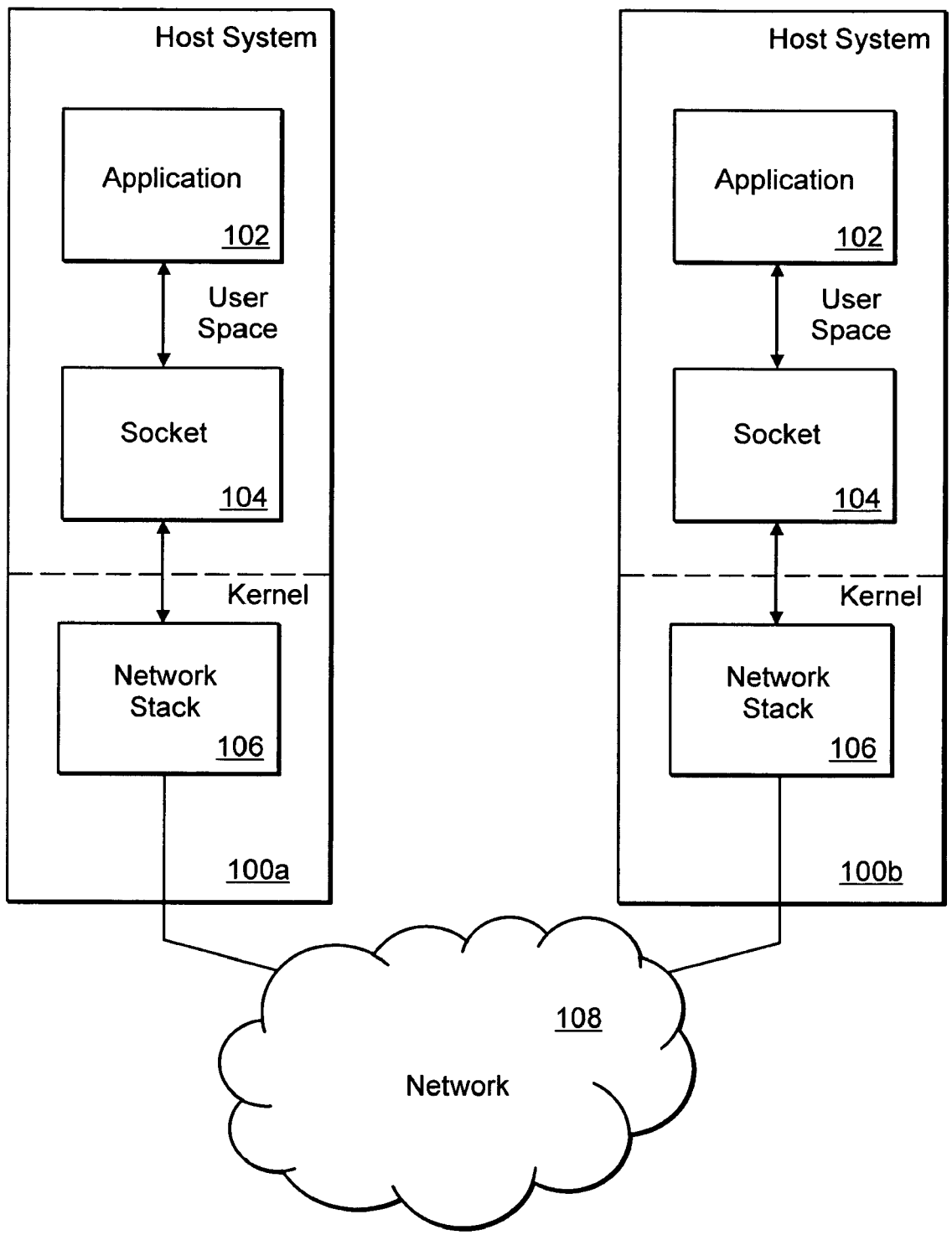
FIG. 1 is a block diagram illustrating software modules in a host coupled to a network that are used to transfer data between applications executing in the host using TCP/IP connection.

FIG. 1 is a block diagram illustrating software modules in host systems (hosts) 100*a*, 100*b* that are coupled to a network 108. The software modules are used to transfer data between applications executing in the hosts 100*a*, 100*b* over a TCP/IP connection. Data is transferred between the applications 102 executing in the hosts through a socket module 104, a network stack 106 and the network 108.

As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

TCP is a connection-oriented protocol defined in Request For Comments (RFC) 793 incorporated herein by reference in its entirety that provides reliable and in-order byte stream transfer to upper network protocol layers. TCP is based on a client/server model. The host sets up a TCP connection between a client process (application) and a server process (application) to transfer packets using the TCP protocol.

A TCP connection consists of two flows. Each flow is unidirectional and is defined as the 5-tuple made by: (1) IP Source Address, (2) IP Destination Address, (3) IP Protocol, (4) TCP Source Port, and (5) TCP Destination Port stored in the TCP header and the IP header. Packets having exactly the same 5-tuple belong to the same flow. A TCP connection between two end points A and B is identified by a pair of flows in opposite directions. The five tuple that identifies these flows only differs in the order in which the source and destination addresses are listed.

Client and server processes (applications) identified by network endpoints (IP address and port number) are represented as sockets. A socket is set up for a particular domain and network protocol for example, UDP or TCP. The server process is identified by binding an IP address and port number to the socket. After the server process is bound to the socket, the socket can be used to listen for new connection requests and to service them.

The network stack 106 is in the kernel, that is, the core of an operating system. The socket 104 provides an Application Program Interface (API) between the application 102 and the network stack 106 in the kernel. An application program (programming) interface (API) is a set of routines used by an application program 102 to direct the performance of procedures by the operating system. In addition, APIs are also provided by the socket 104 to enhance the application performance.

Data transferred over the network 108 is typically stored in user space (application space) in host memory accessible by the application 102 and in network buffers accessible by the network stack 106. Data copying between the network buffers in kernel space in host memory and user application memory is responsible for a substantial amount of system overhead in a network stack. This situation has motivated development of techniques to eliminate copying between the networking stack and the application. In order to provide better performance, offload socket APIs provide a copy avoidance mechanism also referred to as a zero-copy mechanism by sending and receiving data to/from the network directly to user space to avoid copying it between network buffers and user space in host memory.

Figure 2:
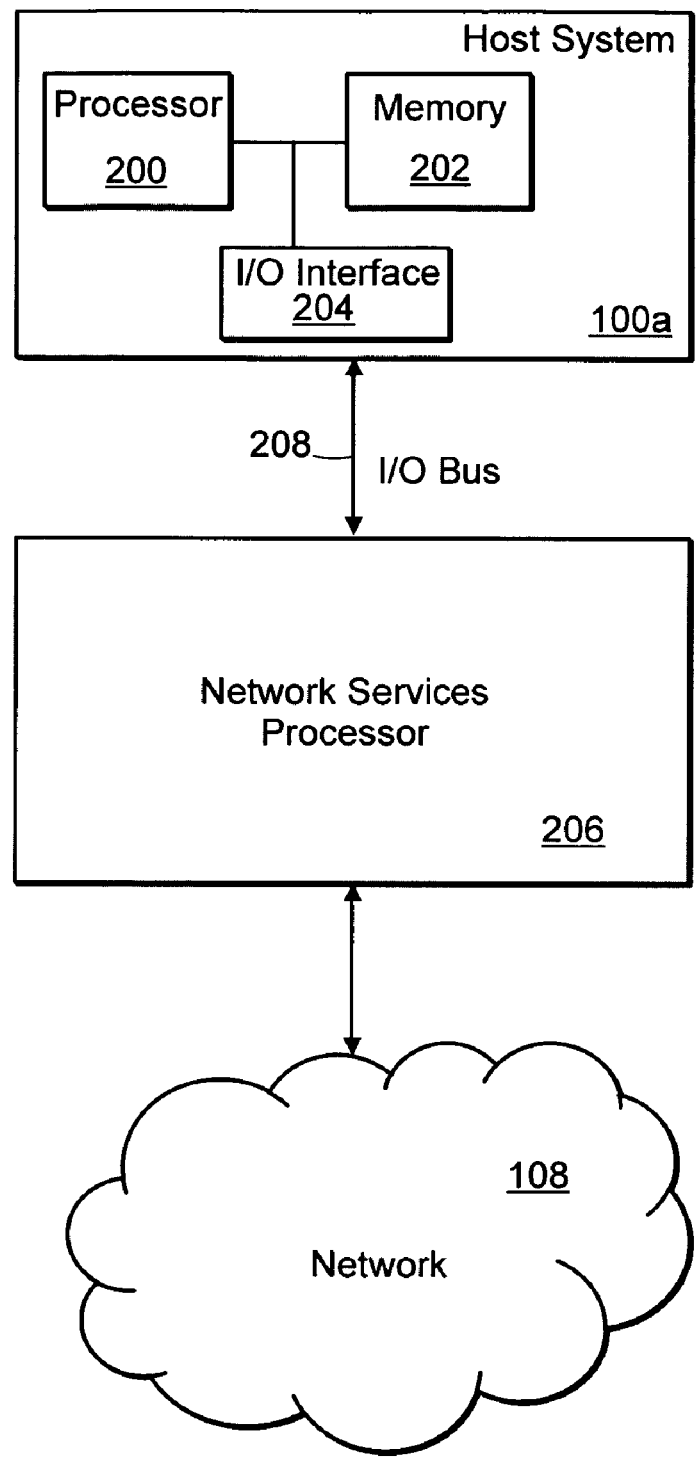
FIG. 2 is a block diagram illustrating a network services processor coupled to one of the hosts shown in FIG. 1 for offloading network layer processing from the host system according to the principles of the present invention.

FIG. 2 is a block diagram illustrating a network services processor 206 coupled to one of the host systems 100a shown in FIG. 1 for offloading network layer processing from the host system according to the principles of the present invention. The network services processor 206 for processes OSI network L2-L7 layer protocols encapsulated in received packets.

The host system 100a includes a processor 200, memory 202 and an Input/Output (I/O) interface 204 through which data is transferred over an I/O bus 208. The application 102, socket module 104 and network stack 106 are stored in memory 202 and executed by the processor 200. The host system 100a is coupled to the network services processor 206 through the Input/Output bus 208. In one embodiment, the Input/Output interface 204 is the Peripheral Connect Interface (PCI), a standard bus interface developed by the PCI Special Interest Group (SIG). The network services processor 206 includes hardware packet processing, buffering, work scheduling, ordering, synchronization, and cache coherence support to accelerate packet processing tasks.

The network services processor 206 performs work (packet processing operations) for upper level network protocols, for example, OSI network L4-L7 layer protocols encapsulated in received packets. The packet processing (work) to be performed on a particular packet includes a plurality of packet processing operations (pieces of work). The network services processor 206 allows processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate. The network protocol processing can include processing of network security protocols such as Firewall, Application Firewall, Virtual Private Network (VPN) including IP Security (IPSec) and/or Secure Sockets Layer (SSL), Intrusion detection System (IDS) and Anti-virus (AV).

Figure 3:
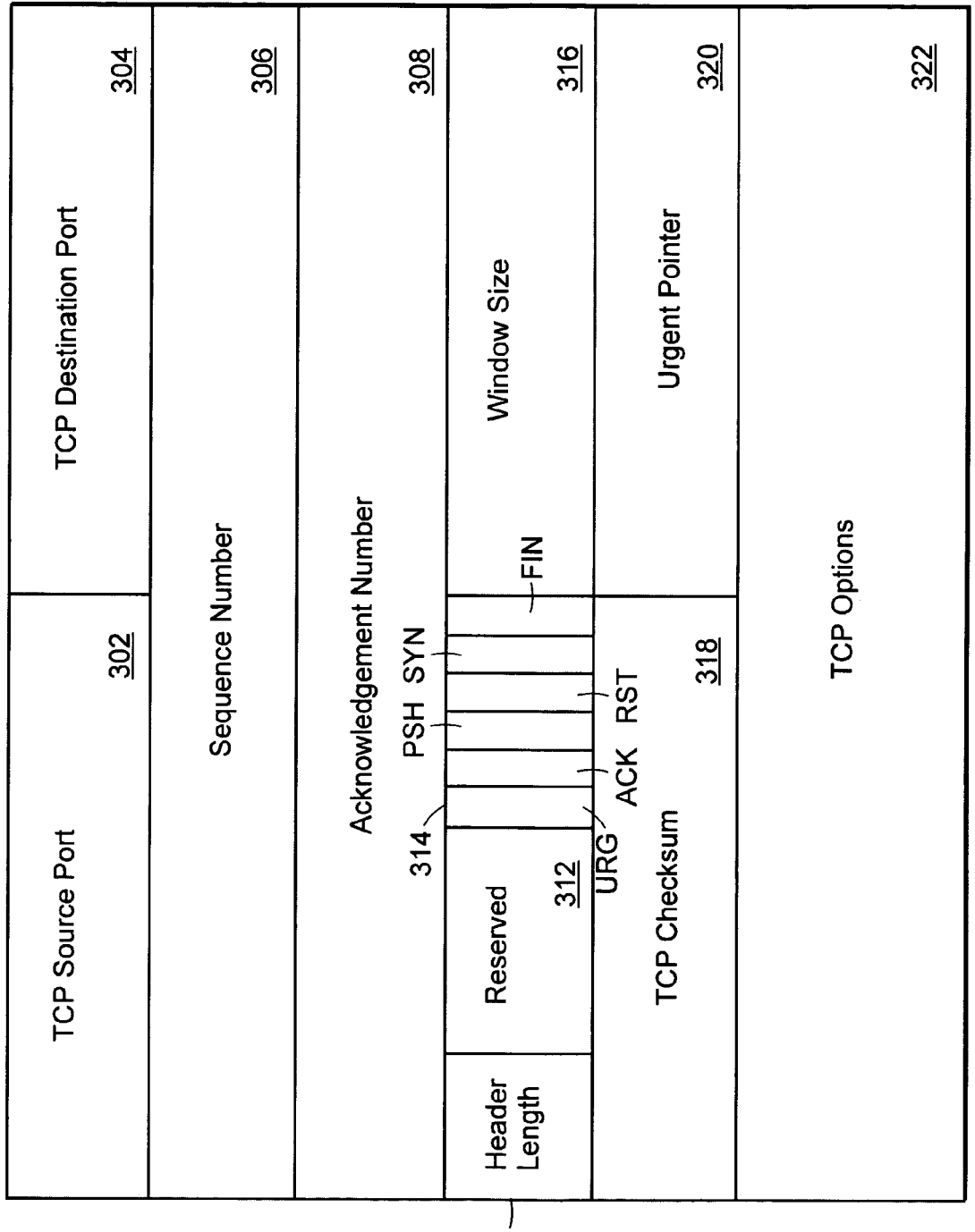
FIG. 3 is a block diagram of a L4 TCP header.

FIG. 3 is a block diagram of a L4 TCP header 300. FIG. 3 is described in conjunction with FIG. 1. In the network stack 106, the TCP layer breaks the data received from the application 102 to be transmitted over the network 108 into smaller chunks and adds a TCP header 300 to each packet. The TCP header 300 includes a source port address 302 and a destination port address 304. The source and destination port addresses correspond to the application executing in the host. The port number is assigned by the TCP layer when an application (layer 7 network protocol layer) makes a connection. For example, there are well-known ports for standard layer 7 applications such as, Telnet, FTP and SMTP. The sequence number field 306 stores a unique sequence number for each packet allowing the packets to be reassembled in sequence at the destination port. The acknowledgement number field 308 stores the sequence number of the next expected packet. The offset field 310 stores the number of 32-bit words in the TCP header. The flags field 314 indicates start, end or reset of a TCP connection or desired type of service. The window field 316 provides precise flow control by indicating the number of bytes that the host can receive on a connection. The checksum field 318 is used to determine whether the packet has been corrupted during transmission. The urgent pointer field 320 indicates the location in the stream of received data at which urgent data ends. The options field 322 is used to transmit optional control data, for example, the maximum TCP segment size.

TCP maintains a checksum of the entire segment and any segment with an invalid checksum is discarded, that is, not acknowledged. One segment fits into a single non-fragmented IP packet. As IP datagrams can be lost, when a segment is sent, a timer is maintained and if an acknowledgement of reception (ACK) is not received, the segment is transmitted again after timeout. IP datagrams can arrive out of order and so can TCP segments but must be passed to the upper layer in order. IP datagrams can be duplicated but a receiver of a TCP segment must discard duplicate segments. TCP also provides flow control, that is, each end of the connection has a finite buffer space and a sender is not allowed to send more than the data that can be stored in the buffer space.

The Acknowledge Number 308 is valid only when the ACK flag in the flags field 314 is set. It is the next sequence number that is expected by the sender of the ACK. Acknowledgements are sent with each data transmission on an established connection. TCP supports only positive acknowledgement up to the last continuous data stream received. No negative acknowledgement is supported.

The TCP flags field 314 includes one or more flags that can be set at the same time. The flags include an URG flag indicating whether the urgent pointer is valid; an ACK flag indicating whether the acknowledgement number in the TCP header is valid; and a PSH flag indicating whether data should be passed to application as soon as possible instead of waiting for more data to come. The PSH flag is typically set by the stack when sender's buffer is empty. A RST flag indicates whether there is a reset connection; a SYN flag indicates whether to synchronize sequence number for connection start; and a FIN flag indicates whether the sender is closing the connection The Window Size field 316 is used for flow control. The Window Size is a 16-bit field storing the number of bytes that receiver can accept (starting from ACK number). The window size is limited to 65535 bytes and can be scaled.

The TCP Checksum field 318 covers the entire segment plus a 12-byte pseudo-header that includes IP source and destination header, protocol, and TCP segment length. The TCP checksum is calculated by the sender and verified by the receiver. The TCP checksum is calculated as ones complement sum of 16-bit words. If the calculated length is not multiple of 16-bit words, a zero byte is padded for calculation only.

The Urgent Pointer field 320 is valid only if URG flag is set in the flags field 314. It is a way to transmit emergency data to the other end. The urgent pointer 320 points to the last byte of urgent data. Urgent data can be sent even if available window size is zero.

A TCP connection is established by the exchange of three TCP segments and is typically referred to as a three-way handshake: The first TCP segment is referred to as the first SYN. The side that sends the first SYN (client) that is, a TCP segment in which the SYN flag is set, and valid source and destination ports and an initial sequence number (ISN) are specified, is said to perform an active open. The second TCP segment is referred to as the SYN/ACK segment. The side that receives the first SYN and sends back the next SYN (server), i.e., ACK-ing the received SYN, thus transmitting the SYN/ACK packet, performs a passive open. The TCP segment includes valid source and destination ports, an initial sequence number (ISN), an acknowledge number (client's ISN plus one) and the SYNC and ACK bits are set. The third TCP segment is referred to as the ACK segment in which the client ACKs the server's SYN/ACK. The TCP segment includes the acknowledge number (server's ISN plus one) and the ACK flag is set.

Figure 4:
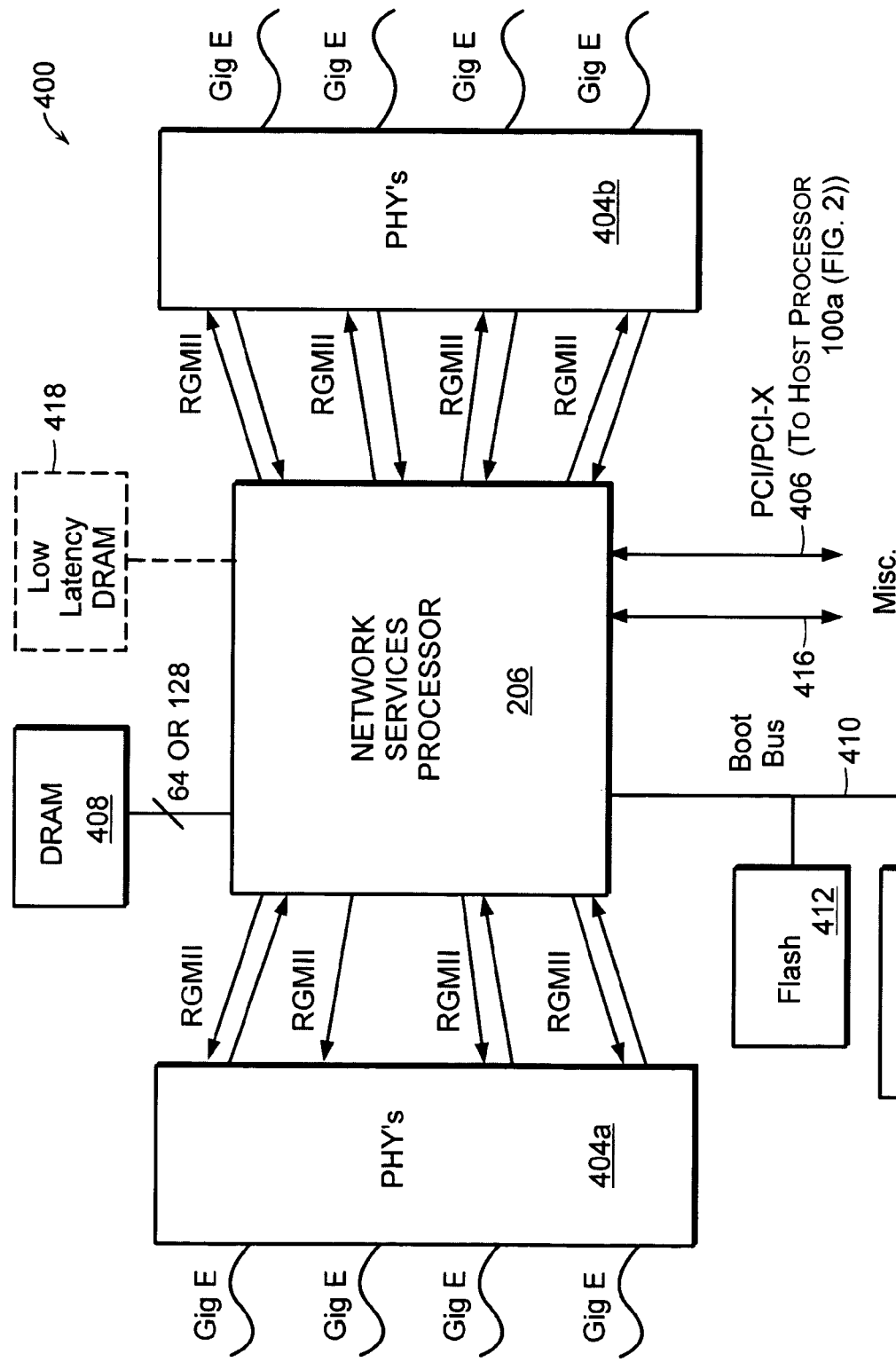
FIG. 4 illustrates the external interfaces to the network services processor shown in FIG. 2.

FIG. 4 illustrates the network services processor 206 shown in FIG. 2 in a security appliance 400. The security appliance 400 includes a plurality of Ethernet Media Access Control interfaces with standard Reduced Gigabit Media Independent Interface (RGMII) connections to the PHYs 404a, 404b.

A security appliance 102 is a standalone system that can switch packets received at one Ethernet port (Gig E) to another Ethernet port (Gig E) and perform a plurality of security functions on received packets prior to forwarding the packets. For example, the security appliance 102 can be used to perform security processing on packets received on a Wide Area Network prior to forwarding the processed packets to a Local Area Network.

The network services processor 206 receives packets from the Ethernet ports (Gig E) through the physical interfaces PHY 404a, 404b, performs L2-L7 network protocol processing on the received packets and forwards processed packets through the physical interfaces 404a, 404b to another hop in the network or the final destination or through the PCI bus 106 for further processing by the host system 100a (FIG. 2). Packets are transferred between the host system 100a and the network services processor 206 according to the principles of the present invention.

A DRAM controller in the network services processor 206 controls access to an external Dynamic Random Access Memory (DRAM) 408 that is coupled to the network services processor 206. The DRAM 408 stores data packets received from the PHYs interfaces 404a, 404b or the Peripheral Component Interconnect Extended (PCI-X) interface 406 for processing by the network services processor 206. In one embodiment, the DRAM interface supports 64 or 128 bit Double Data Rate II Synchronous Dynamic Random Access Memory (DDR II SDRAM) operating up to 800 MHz.

A boot bus 410 provides the necessary boot code which is stored in flash memory 412 and is executed by the network services processor 206 when the network services processor 206 is powered-on or reset. Application code can also be loaded into the network services processor 206 over the boot bus 410, from a device 414 implementing the Compact Flash standard, or from another high-volume device, which can be a disk, attached via the PCI bus.

Packets can also be received over the PCI bus 406 and data received in packets over the RGMII connections interface can be forwarded to a host system coupled to PCI bus 406.

The miscellaneous I/O interface 416 offers auxiliary interfaces such as General Purpose Input/Output (GPIO), Flash, IEEE 802 two-wire Management Interface (MDIO), Universal Asynchronous Receiver-Transmitters (UARTs) and serial interfaces.

The network services processor 206 includes another memory controller for controlling Low latency DRAM 118. The low latency DRAM 418 is used for Internet Services and Security applications allowing fast lookups, including the string-matching that may be required for Intrusion Detection System (IDS) or Anti Virus (AV) applications.

Figure 5:
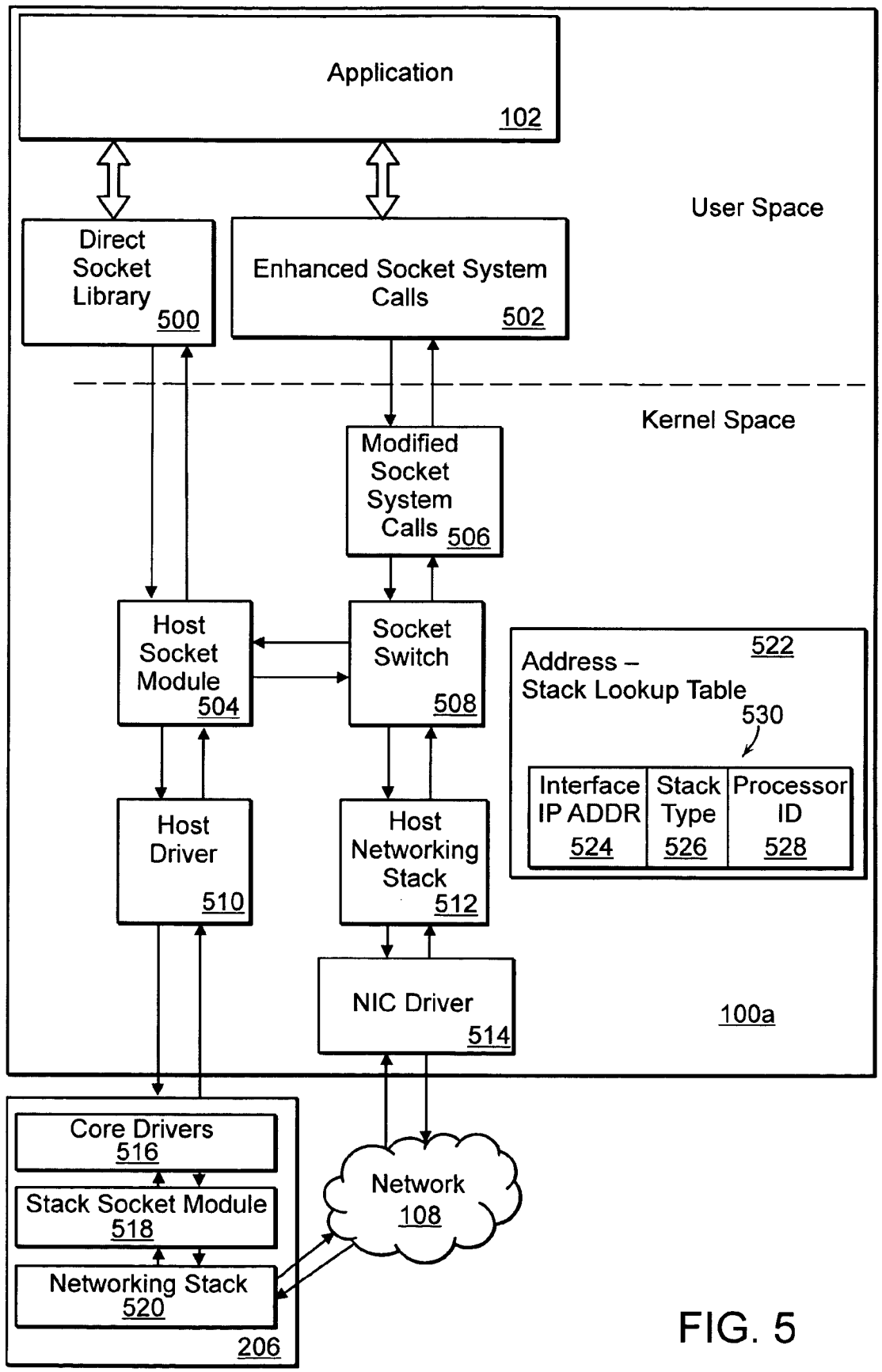
FIG. 5 is a block diagram illustrating software modules stored in the host system 100*a* and the network services processor for transferring data between applications over a TCP connection according to the principles of the present invention.

FIG. 5 is a block diagram illustrating software modules stored in the host system 100a and the network services processor 206 for transferring data between applications 102 over a TCP connection according to the principles of the present invention.

An application 102 executes in application (user) space in memory in the host system 100a. The application 102 issues API calls using API functions provided by the Direct Socket Library module 500 or the enhanced socket system calls module 502. Requests through the socket interface 500, 502 are either directed through the system TCP/IP (host) network stack 512 to a NIC driver 514 or through a host driver 510 to the network services processor 206.

The application 102 makes socket API calls to the socket modules 500, 502 to establish a TCP connection between a client process and a server process. A server process sets up a communication endpoint and passively waits for a connection from the client process. A client process initiates communication with a server process that is passively waiting to be contacted.

Data transfer for an application 102 for the TCP connection can be directed through the host networking stack 512 or the processor networking stack 520 in the network services processor 206 dependent on the API call issued by the application 102. Host socket APIs are a superset of legacy BSD socket APIs. The host socket APIs call functions in the enhanced socket system calls module 502. These API calls include flags used by the operating system to select one of the stacks, that is, the networking stack 520 in the network services processor 206 or the host networking stack 512 in kernel space in the host system 100a. The socket modules 500, 502 provide a uniform interface to the network and communications protocols. Protocol independent requests are mapped to the protocol specific implementation selected when the socket is created. The socket APIs provide a BSD like socket interface which enables applications written for the BSD socket interface to direct requests to the network services processor 206 with minimal or no changes.

API calls that avoid use of the host networking stack (network protocol stack) 512 in the host system 100a are provided by the direct socket calls module 500 and the application 102 can be modified to use these API calls instead of the BSD socket calls that use the host networking stack 512 in the host system 100a.

The host driver 510 and the network services processor 206 communicate using Direct Data Output Queues (DDOQ) and control queues (CNTQ). The TCP stack running on a core (processor) in the network services processor 206 sends packets/messages to the Host 100a via the DDOQ. Data is moved asynchronously between local memory in the network services processor 206 and remote (PCI) memory in the host in both directions using Direct Memory Access (DMA).

In more detail, two counters and associated interrupts are provided to support two queues located within the host memory. The queues are referred to as CNTQ0 and CNTQ1. Each CNTQ is managed by software running on the cores and has a respective ring buffer stored within host memory along with associated head and tail pointers, and available-size values. Registers can be used to set packet count threshold and timeout values for flexible host support. The host driver 510 configures the base pointer and size for each of the CNTQs at boot time. Software running on the cores sets the current header and tail pointers to the base address of the ring. The available-size value is initialized to the size of the ring buffer.

Information about the connection data transferred is written by software running on the cores along with connection identifier into the memory location in PCI host processor memory indicated by the base pointer plus head pointer. Software running on the cores also manages "wrap-around" of the head pointer when it reaches the size of the ring buffer. Host software guarantees that the available size never goes below zero by crediting space in CNTQ back to core software. The ring is strictly in order, meaning that host software does not send the "cntq_credit" instruction (or in other words increases the available size) until the oldest packet has been removed. When the available size value reaches zero, software running on the cores stops writing packets into the ring.

Core software inserts information about the connection data transferred at the head of the ring buffer in host memory. The host software extracts this information from the tail of the ring and reports to core software the amount of space that it freed up.

FIGS. 6A-D illustrate the format of structures stored in host memory for implementing a plurality of connections.

Figure 6A:
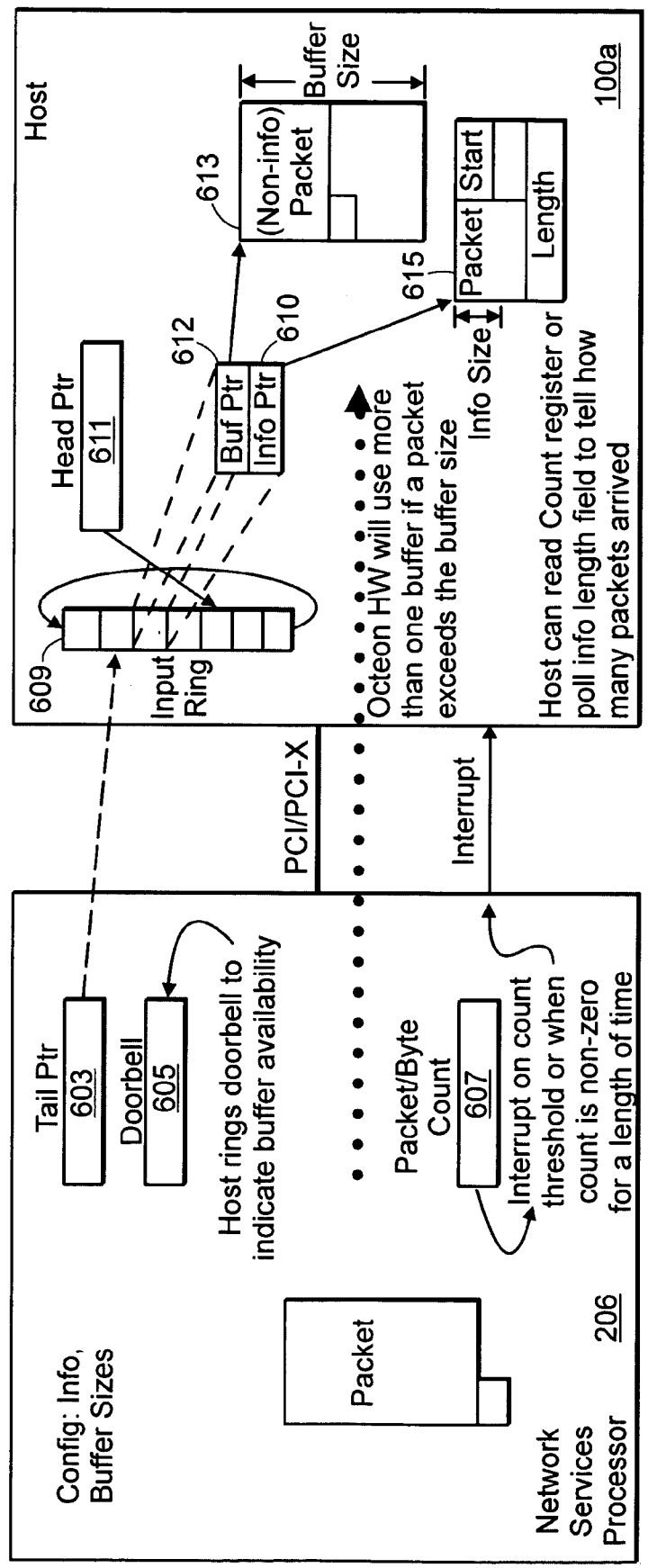

Referring to FIG. 6A, an input ring 609 in the host system 100a stores buffer/information pointers 612, 610 to memory 613, 615 in which packet data and information is stored. The network services processor 206 reads the buffer/information pointers from the host system 100a, writes packet and information to the host system 100a and updates the local packet/byte count in a packet/byte count register 617. The network services processor 206 stores a tail pointer 603 to the input ring 609 in the host system 100a and the host system 100a stores a head pointer 611 to the input ring 609. The host system rings a doorbell 605 in the network services processor 206 to indicate buffer availability in the host system 100a. The host system 100a can read the count register 607 to determine how many packets have arrived. Through the use of the packet/byte count register 607, the network services processor 206 can generate an interrupt to the host system 100a on a count threshold or when the count is non-zero for a period of time.

Figure 6B:
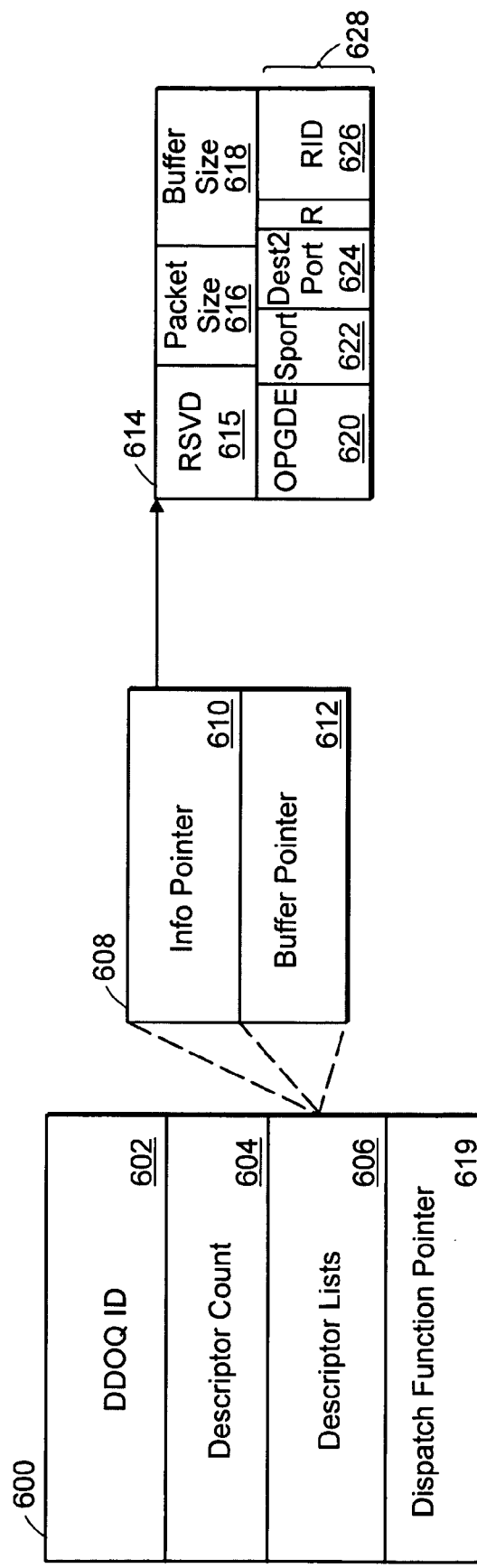

FIG. 6B illustrates the format of a DDOQ 600. The DDOQ 600 has an identifier 602, a descriptor count 604, descriptor lists 606 and a dispatch function pointer 619. The identifier field 602 stores a unique ID of the DDOQ. When data arrives for the application 102 executing in the host, the dispatch function is called. Per-flow queuing is supported through the use of the DDOQ.

Each entry (descriptor) 608 in the descriptor list is an information/buffer pointer pair. The information pointer 610 stores a pointer to information 614 and the buffer pointer stores the location of the buffer in host memory corresponding to the entry 608. The DDOQs are stored in host memory and base pointers and head/tail pointers for the DDOQs are stored in memory in both the host processor and the network services processor 206. Control queues are also stored in host memory and the base and head/tail pointers for the queues are stored in memory in both the host and the network services processor.

The core driver 514 maintains a descriptor ring in "local" memory directly accessible by the network services processor for each DDOQ. A unique 32-bit value is used to identify each DDOQ 600. Normally one DDOQ queue is used for each "data flow". A "data flow" is defined as a connection between two communicating end-points. A simple example of "data flow" is a TCP socket connection. The host driver 510 issues an instruction to initialize a DDOQ 600. Upon receiving the instruction the core driver 516 allocates a buffer in local memory for storing base and head/tail pointers for the DDOQ 600 and maintains a descriptor list provided by the host driver 510.

DDOQs 600 are helpful in dividing the traffic among several data flows for example TCP sessions. A DDOQ is created by the network services processor 206 based on a request from the host system 100a that includes the size of a descriptor ring and a list of descriptors. When a packet is moved into the host memory (at the buffer address identified by the information/buffer pointer pair), the information about the packet is stored in the host memory pointed to by the information pointer 610. If a packet is to span more than one descriptor 608, then the network services processor 206 writes the packets in the multiple descriptors. The host processors determines the numbers of descriptors by looking at the packet_length and buffer_size stored in the information pointer 610.

The list of descriptors is used to move packets to the host memory using Direct Memory Access (DMA). Instead of copying the next descriptor from host memory, the network service processor 206 creates a descriptor ring in local memory and fills it with the descriptors provided by the host 100a. The network services processor 206 manages head/tail pointers internally and stops sending packets to the host when all descriptors have been used. Under normal operation, the host credits descriptors after receiving one or more packets from the network services processor 206.

The information pointer 610 in the descriptor 608 points to an information structure 614. Each descriptor 608 may have a different buffer size indicated by the buffer size stored in the buffer size field 618 in the information structure 614. The buffer size field 618 stores the size of the contiguous host memory block pointed to by the buffer pointer 612. The host driver 510, at DDOQ and descriptor creation time, initializes the buffer size field 618. The packet size field 616 stores the size of the packet copied by the network services processor in this descriptor. The packet size field 616 is updated by the network services processor when it copies the packet to the host memory pointed to by the descriptor 608.

All instruction responses and packets sent to the host 100a from the network services processor 206 include a response header 628. The response header includes an opcode 620 that identifies the packet type and error code. The response header also includes a SPORT field 622 that stores the source port of the packet/instruction that is used by the host driver 510 if the packet is a response to an instruction sent by the host driver 510. The DSPORT field 624 in the response header stores the destination port of the packet. The destination port is used to identify the DDOQ. The Request ID (RID) field 626 stores a request identifier sent by the host driver 510. This is used in conjunction with the destination port stored in the SPORT field 622. If a packet spans more than one descriptor 608 only the information structure of the first descriptor is updated.

The host 100a can calculate the number of descriptors used by looking at the packet size field 616 of the first descriptor's information structure.

FIG. 6C is a block diagram illustrating the format of a socket parameters structure. The type field 642 indicates the type (server or client) of the application. Once the type of application is identified as a server application, all requests that are held by the socket switch module 508 are passed to the stacks. The which stack field 650 stores the network stack selected for the socket, the application file descriptor field 652 stores the file descriptor sent back to the application. The file descriptor is allocated from a range which is outside the descriptor range used by the operating system to ensure that the descriptor number allocated by the socket switch module 508 does not collide with the descriptors allocated by the operating system running on the host system 100a. The stack file descriptor 654 stores the file descriptor returned from the host networking stack 512. The socket file descriptor 656 stores the file descriptor returned from the networking stack 520 in the network services processor 206.

FIG. 6D illustrates the format of a host socket structure 690. The information in the host socket structure 690 includes the identifier for the DDOQ stored in the DDOQ identifier field 658, and a type (accept or receive) associated with the DDOQ stored in the type field 660. The network services processor identifier field 662 stores an identifier for the network services processor. The "Number of list entries" field 664 stores the number of entries of the accept or receive list. The list head field stores a pointer to the head of the accept or receive list. The socket flags field 670 stores socket flags such as an indication of non-blocking or zero-copy. The operation flags field 672 stores other operation flags such as status flags.

Figure 7:
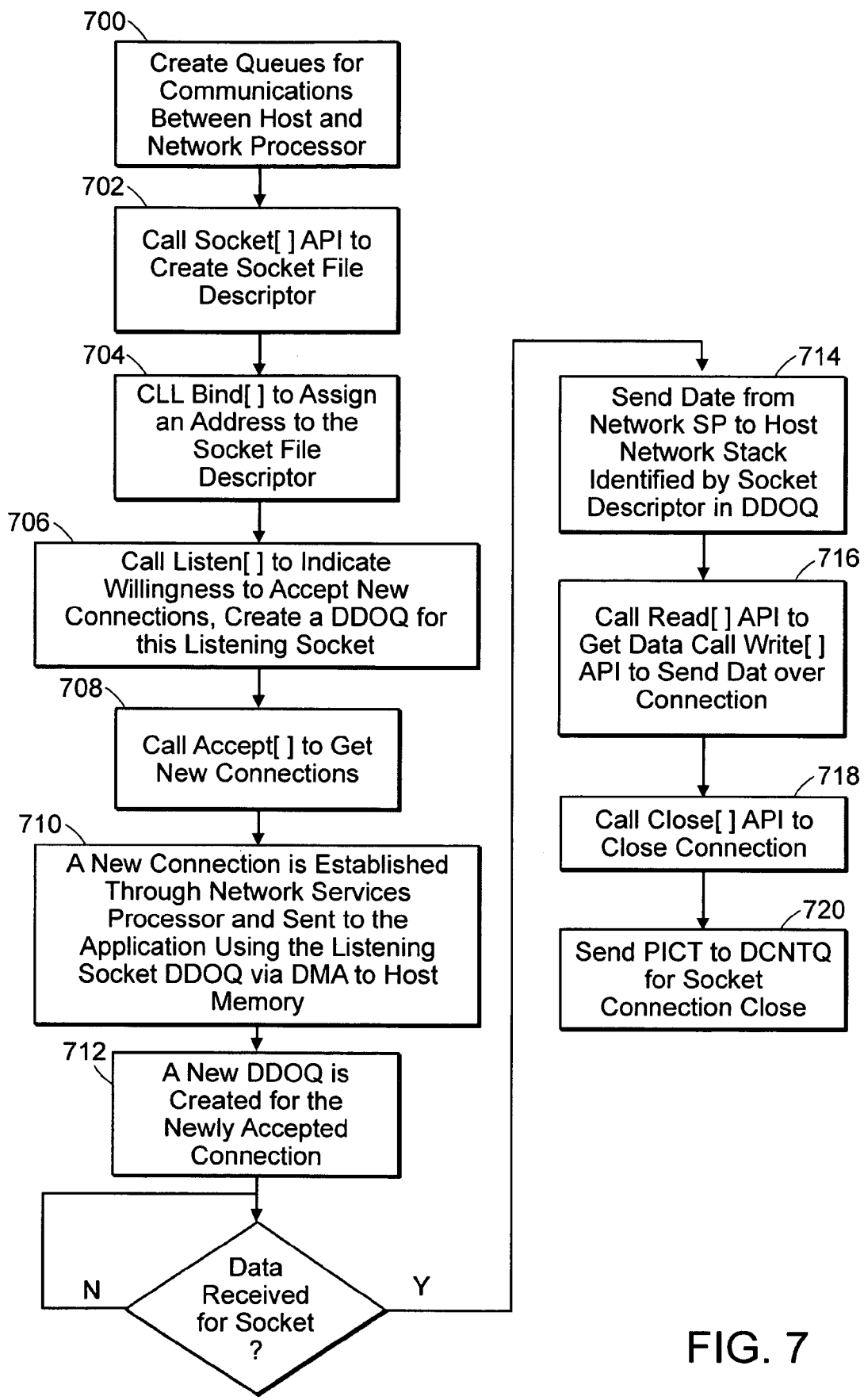
FIG. 7 is a flowchart illustrating a method for setting up a TCP connection and sending packets for the TCP connection directly to application space using the DDOQ shown in FIG. 6B according to the principles of the present invention.

FIG. 7 is a flowchart illustrating a method for setting up a TCP connection and sending packets for the TCP connection directly to application space using the DDOQ shown in FIG. 6B according to the principles of the present invention.

The standard BSD socket API calls socket( ), bind( ), listen( ), accept( ), write( ) and close( ) are well known to those skilled in the art and beyond the scope of the present invention.

At step 700, at boot time, the host driver 510 creates two control queues (CNTQ). These queues serve as a low latency message communication mechanism for messages from the network services processor 206 to the host system 100a.

At step 702, the application calls the socket( ) API to create a new socket file descriptor. The stack socket module 518 returns the socket file descriptor to the host driver 510.

At step 704, the application calls the bind( ) API to assign an address to the socket file descriptor.

At step 706, the application calls the listen( ) API to listen for connections on the socket file descriptor. A DDOQ is created and associated to the listening socket. This DDOQ will be used by the stack socket module 518 to push new connections to the host socket module. The host socket module 504 keep a linked list of new connections which have been accepted by the networking stack 520, but are not being accepted by the application.

At step 708, the application calls the accept( ) API to get a connection.

At step 710, the stack socket module sends a "connection socket file descriptor" to the application using the DDOQ created in the previous step. The connection socket file descriptor is sent via DMA to the Host memory location identified by the next descriptor in the listen socket's DDOQ.

At step 712, a DDOQ is allocated for the connection. For each connection socket, the Host socket APIs create a new DDOQ. From now on all communications for the listen socket file descriptor are via the Direct Data Output Queue (DDOQ).

At step 714, when data arrives on a socket, the network services processor 206 sends the data via DMA to the host memory location identified by the next descriptor in the socket's DDOQ. The network services processor also sends a packet to one of the control queues in the host to notify the Host driver 510 that new data has arrived on the socket connection.

At step 716, the application 102 calls the read( ) socket API to read the data arrived in step 714. The application 102 can also call write( ) socket API to send the data over the socket connection. The network services processor 206 sends a packet to the host to notify the host about the successful transmission of data.

At step 718, the application calls close( ) to close the socket connection.

At step 720, the socket switch module sends a packet to a DMA control queue (CNTQ) for the socket when the connection closes.

Figure 8:
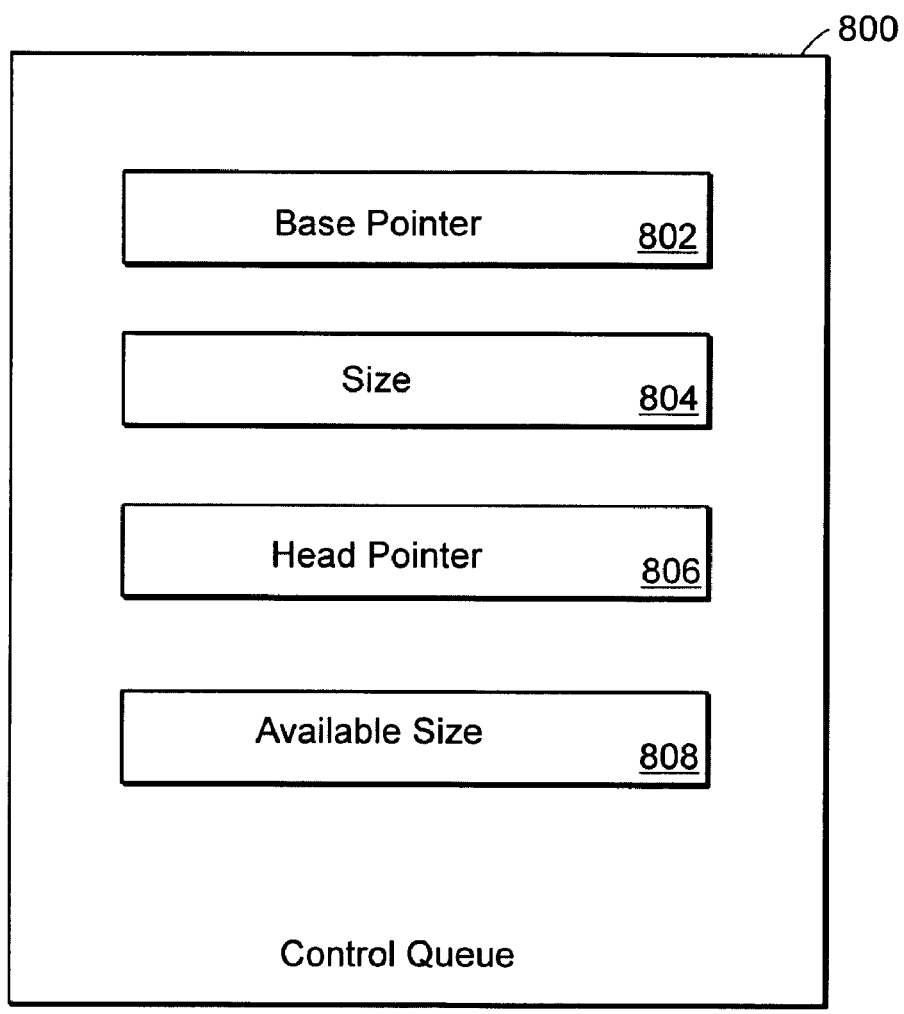
FIG. 8 illustrates registers used to manage and represent one of the control queues used for transferring data directly between host memory and local memory in the network services processor.

FIG. 8 illustrates registers used to manage and represent one of the control queues used for transferring data directly between host memory in the host system 100a and local memory in the network services processor 206.

The network services processor 206 includes two counters and associated interrupts to support two control queues (CNTQ0-1) in the host memory. The network services processor 206 manages the counters. Each counter has an associated ring buffer in host memory and associated head/tail pointers and available size values maintained by the network services processor 206.

The network services processor 206 inserts received packets at the head of the ring buffer in host memory. The host 100a extracts packets from the tail of the ring buffer and indicates the amount of space that it freed up by sending an instruction to the network services processor.

The network services processor 206 maintains the following values to control and represent a control queue CNTQ. (a) A base pointer 802 to the start of the memory block in the host memory that contains the ring buffer. The base pointer is initialized at boot time and not subsequently modified. (b) A size 804 that indicates the size of the ring buffer in 8-byte blocks. This value is initialized at boot time and not subsequently modified. (c) A head pointer 806 that indicates the position in the ring where the network services processor will write the next packet. Under normal operation, the network services processor increments/wraps this value as it writes in a new packet. (d) An available size 808 that indicates the number of 8-byte blocks that are available for the network services processor to write in the ring buffer. Under normal operation, the network services processor 206 decrements this value as it writes in a new packet, and the host software increments this value via an instruction as it removes packets from the ring buffer (in order). The available size value is initialized by the network services processor to the size of the ring.

The network services processor 206 and the host driver 510 maintain the control queues. As with the DDOQ rings described in conjunction with FIGS. 6A and 6B, the base and head/tail pointers for each of the two control queues are maintained in local memory, and communication between the host and the network service processor is performed via PCI instructions sent to the network services processor 206.

The network services processor 206 includes registers to set the interrupt threshold for packet count or timeout and DMA counters to indicate the number of packets sent to the host system in the ring buffer. The core driver 516 acknowledges the packet receipt by writing registers with the number of packets it has extracted from the respective ring. In other words, it indicates the number of unacknowledged packets. Under normal operation, the network services processor 206 increments this register after it writes each packet into the ring, and the host 100a decrements this count to acknowledge packets.

The core driver 516 can set interrupt levels when the number of unacknowledged packets increases above a programmed threshold or on a timeout. The core driver 516 configures the base pointer and size for each of the control queues at boot time. The current header and tail pointers are set to the base address of the ring and the available size is initialized to the size of the ring buffer. The packet is moved via DMA from the network services processor 206 into the memory location in PCI host processor memory indicated by the base pointer plus head pointer.

The ring is strictly in order and the available size is not increased until the oldest packet has been removed. Data is transferred to the buffer addresses supplied by the host driver in a descriptor (info/buffer pointer) queue implemented using a ring buffer. Each entry in the ring is an info/buffer pointer pair as shown in FIG. 6. Through the use of PCI instruction, the host driver rings a "doorbell" to indicate space availability in a ring to the network services processor.

When the network services processor 206 wishes to send a packet to one of the DDOQ rings, it sends the packet data and also sends a control packet to a selected one of the two available control rings (CNTQ). This control packet includes a Response Header 628 to identify the DDOQ ring and packet size. The control packet serves as the indication to the host driver 510 in the host system that a packet arrived.

The network services processor 206 consults the base address and head/tail pointers that it maintains in local memory to determine where both the packet data and the control packet data should be written in the host's memory. To transfer the packet data from local memory into the host memory, the network services processor constructs PCI DMA local pointers and PCI DMA host pointers. The network services processor 206 also appends additional PCI DMA local pointers and PCI DMA host pointers to transfer the control packet into the host memory after it has transferred the data packet.

Returning to FIG. 5, to transfer data directly between application memory and the network services processor 206, the application 102 uses a specialized zero-copy buffer pool in host memory for data transfers. The conventional mechanism of copying data from the user application to a networking buffer in kernel space that is, non-zero copy and vice versa is also supported. The option of selecting the zero-copy mechanism is controlled either through special flags in API calls or through the use of special API calls. For a TCP connection, the choice of using the zero-copy mechanism is made before the TCP connection is established. For a UDP connection, the selection is made before the first data transfer operation.

To set up the zero-copy mechanism, the application 102 issues an API call to request allocation of a buffer or multiple buffers from a specialized zero-copy buffer pool in host memory and to select zero copy for send and receive. The application 102 uses buffers for the I/O operation which have been allocated from the zero copy buffer pool. The buffers are freed later by the application 102.

The enhanced socket system calls module 502 provides standard BSD calls for host applications 102 executing in a host system that is executing a standard operating system. The requests are directed through the modified socket system calls module 506 through the socket switch module 508 and the host networking stack 512 to the Network Interface Card (NIC) driver 514.

Direct socket APIs call functions in the direct socket calls module 500. The direct socket APIs have similar functionality to the BSD socket APIs in the enhanced socket system calls module 502 but the API calls are directed to the direct socket calls module 500 instead of the enhanced socket system calls module 502. The direct socket APIs are then directed to the host socket module 504 in the kernel through a system call to the kernel. The host socket module 504 includes functions for obtaining a unique file descriptor, ensuring that socket binding restrictions are met and maintaining connection related information.

The application 102 and enhanced socket system calls module 502 are stored in user space in memory in the host system 100a. The enhanced socket system call module 502 includes a set of Application Programming Interface (API) functions that can be called by the host application to provide networking services. The application calls an API function in the enhanced socket system calls module 502 which makes a system call to the kernel. The underlying protocols and network mechanisms are hidden from the application 102. The socket interface provided through the enhanced socket system calls module 502 and the socket switch block 508 in the kernel provides the service requested by the system call by calling low-level functions in the kernel that handle the networking protocol.

A system can have multiple networking interfaces, for example, the NIC interface through the NIC driver 514 and the network interface through the network services processor 206 shown in FIG. 5. The interface's corresponding network stack can be used for all data communication. For example, if a server process in the host system 100a receives a connection on a particular network interface, the corresponding stack is used for all subsequent sends and receives for the connection.

The enhanced socket system calls module 502 provides a mechanism to avoid use of the host networking stack 512 in cases for which the application 102 cannot be modified to use API calls provided by the Direct Socket Library module 500. If the application 102 is running in a system that is executing a standard operating system, modified BSD calls are provided through the enhanced socket system calls module 502. If the application does not specify a flag in create socket API call to choose a stack, additional checks are performed to select the stack.

There may be cases where it is not possible to modify an existing host application, but there may be a need to both bypass and use the host networking stack 512. This support is provided by allowing a decision to be made as to which networking stack to use when a socket is created. An application using host socket APIs makes a decision as to whether to use the host networking stack 512 through the use of flags in the API call when issuing an API call to create the socket.

An address-stack lookup table 532 is maintained in the kernel or operating system in which the IP address of each interface is associated with the type of networking stack, that is, the processor networking stack 520 in the network services processor 206 or the host networking stack 512 in the host system 100a. Each entry 526 of the table includes the following fields: Interface IP address 524, Networking stack type (processor or system) 526 and Processor ID 528.

Each interface IP address is either for the host networking stack 512 or the processor processing stack 520. As there can be multiple processors in the host system 100a, in the case of a processor interface, the Processor ID field 528 indicates which processor the interface belongs to. The address-stack lookup table 522 is initialized and updated through a separate utility executed in the host system. The standard API calls getsockopt and setsockopt allow socket options to be queried and set. Options such as stack type, socket type, zero-copy receive and send can be set through the use of the setsockopt API call. The values of the options can be obtained using the getsockopt API call.

Both the client and the server process create a Transmission Control Block (TCB) during the establishment of the connection. The TCB is a data structure used for a TCP/UDP connection that stores information about the connection, such as, pointers to buffers in which incoming and outgoing data are stored, the number of bytes received and acknowledged and socket identifiers for the client and server processes that identify the connection. The use of a TCB for sending information for a TCP connection is known to these skilled in the art.

The socket identifier typically includes the IP address and the port number of the end point of the connection. As the client process knows the IP addresses and port numbers for both the client process and the server process, these are typically used to uniquely identify the connection, as discussed above. The TCB is maintained throughout the connection.

The socket switch module 508 interprets socket API calls from the modified socket system calls module 506 and directs the API calls to the appropriate networking stack 512, 520. To support existing unmodified applications, both the client process and server process cases are handled differently.

Figure 9:
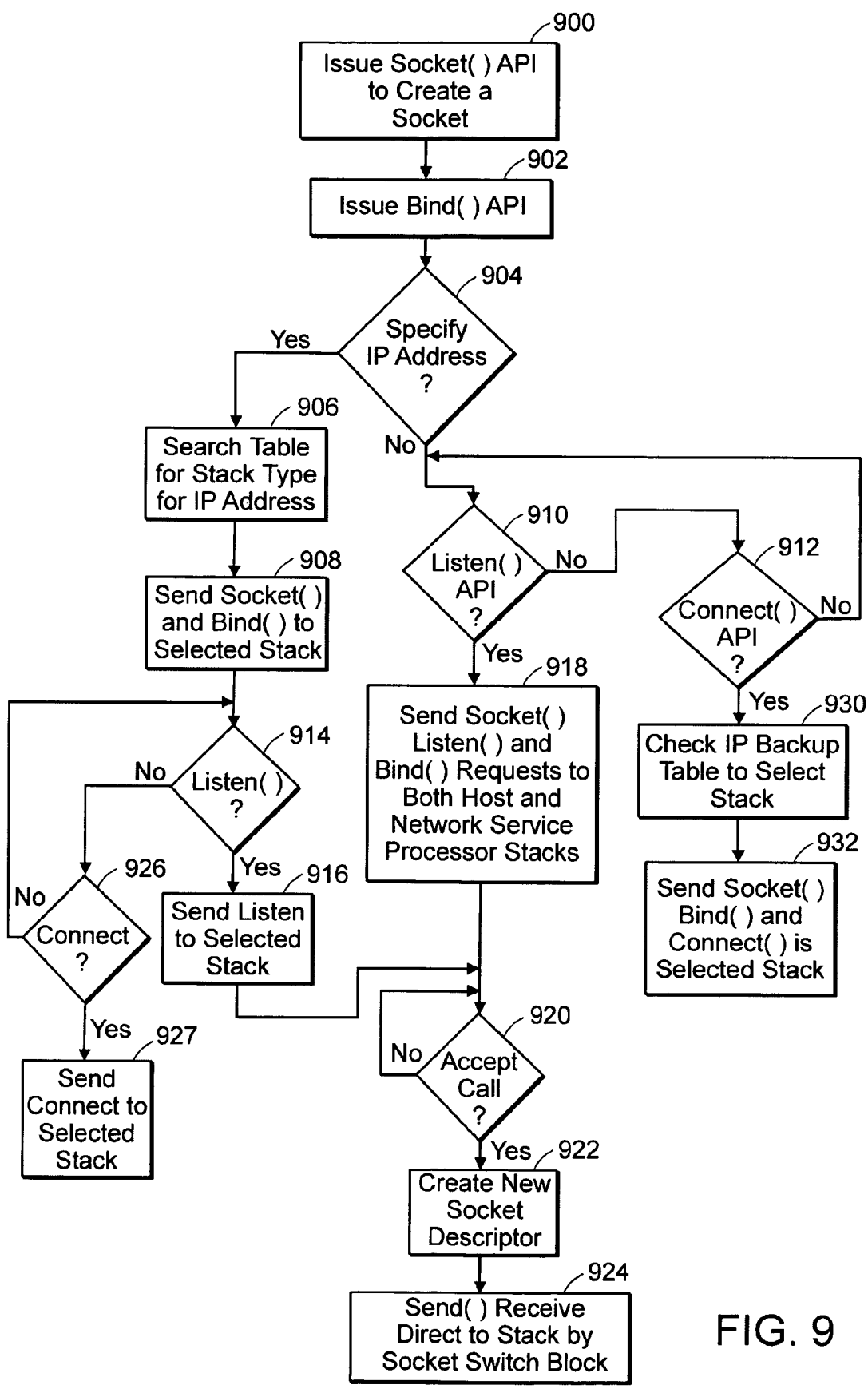
FIG. 9 illustrates a method for selecting a stack in an unmodified server application.

FIG. 9 illustrates a method for selecting a stack in an unmodified application. FIG. 9 is described in conjunction with the software modules shown in FIG. 5.

On the server process side, a network stack selection decision is based on which network stack the connection request from the client process is coming from, that is, through the network services processor 206 or the NIC driver 514. Typically, a server process creates, binds and listens on a socket. Later, an accept that is received from the client process, returns a new file descriptor to be used for subsequent sends and receives.

At step 900, the application 102 first issues a BSD socket( ) API call to create a socket. This request to create a socket is sent through the enhanced socket system calls module 502 in user space in the host system 100a and the modified socket system calls module 506 in kernel space and is buffered by the socket switch module 508. The request is not passed to either of the networking stacks. However, a file descriptor for the connection is allocated and returned to the application 102. The file descriptor is also referred to as a handle or socket descriptor and is passed to other API functions subsequently called by the application 102 to identify the particular socket.

The socket switch module 508 allocates structures to store the parameters of the socket, bind API as well as additional file descriptor related information. After copying the socket API parameters, the socket switch block 508 allocates a file descriptor. The file descriptor and other parameters for the API are stored in a socket parameters structure 680 which has already been described in conjunction with FIG. 6C. Once the type of application is identified as a server application through the listen API, all the requests held by the socket switch block 508 are passed down to the stacks 520, 512 using functions provided for this function. The host socket module 504 creates a host socket structure for each socket and sends the request to the Host Driver 510.

The host socket structure 690 has already been described in conjunction with FIG. 6D.

When a socket is created by the application 102, it has an associated protocol (TCP or UDP), but no IP address and port number. The server socket cannot receive messages from a remote application until it is bound to a port number.

At step 902, the application issues a bind( ) API call to set up the connection to the port known to the client process. If at step 904, an IP address is specified in the bind API call, at step 906, the address stack lookup table in the kernel is consulted to find the stack type associated with the IP address. At step 908, once the networking stack type (processor or host) has been selected, the buffered socket and the bind requests are sent to the selected stack, and all the subsequent calls to this socket descriptor use the selected stack.

The host driver 510 sends a socket creation request to the network services processor 206. This request is passed to the Core driver 516 and then to the stack socket module 518. The stack socket module 518 sends it to the network stack 520, waits for the response and then returns a socket identifier and a response header to the core driver 516. The core driver 516 issues a DMA request to send the results and the completion code using the pointer to the application provided in the socket creation request. The host driver 510 passes the results back to the host socket module 504. The host socket module 504 updates the structure and returns status (success or failure) to the socket switch module 508.

The host socket module 504 sends a bind request (bind API) to the host driver 510 which sends the request to the network services processor 206. On receipt of the request by the network services processor, the information is passed to the core driver 516 and later to the stack socket module 518. The stack socket module 504 sends the request to the networking stack 520, waits for the response and later returns to the core driver 516 along with the response code. The core driver 516 issues a DMA request to send the results and the completion code back to the host driver 510. Upon receiving the result, the host driver 510 returns the result to the host socket module 504. The host socket module 504 returns status to the socket switch module 508.

If at step 904, the application specifies a wild card address in the bind API call instead of identifying a particular IP address, this information is buffered in the socket switch module 508. The wild card address allows the server process to receive connections addressed to any of its IP addresses. The socket and bind APIs are buffered by the socket switch module 508 because at this point, it is not clear whether the application is going to behave as a server or a client process. A subsequent API call, either listen at step 910 or connect at step 912 indicates whether the host application is a server or a client process (program).

As discussed earlier, a client program initiates communication with a server process and a server process (program) waits for clients to contact it. Prior to initiating communication, the client program needs to know the server's IP address and port. The client program can find out a server program's IP address by providing the Uniform Resource Location (URL) to a name resolution service. The port number is typically dependent on the type of application, for example, fixed port numbers are assigned to applications such as the File Transfer Protocol (FTP) and Telnet.

At step 914, the server program calls the listen API. If the address in the bind API was not a wild card address, at step 916, the listen API is sent to the selected stack. Otherwise, at step 910, if the server program calls the listen API, then at step 918, the listen API along with all the previously buffered requests, that is, a socket API call and bind API call are first sent to the host networking stack 512. The host networking stack 512 creates a listening socket. On a successful return, all the requests are also sent to the processor networking stack 520. If both stacks establish listening sockets, a successful completion status is returned to the application. From the application point of view there is only one socket descriptor, but actually there are two different socket descriptors listening on two different network stacks. The socket switch module 508 multiplexes and de-multiplexes the requests using the correct socket descriptor.

When the application 102 issues the accept API call, the socket switch module 508 passes the request to the host socket module 504. The host socket module 504 checks if there are new connections in the accept list. If there is no connection available, the host socket module 504 returns. The accept API is also sent to host socket module to indicate that application is willing to accept new connections.

In the blocking case, the process making the accept API call goes to sleep. When a new connection is available through network stack 520, the host driver 510 calls a dispatch function that is registered when initializing the DDOQ. The dispatch function inserts the new connection information in the accept list and wakes up the sleeping process.

Once the new connections are available, a DDOQ structure is allocated for each connection and the fields are updated accordingly.

For each connection, a corresponding DDOQ is set up to hold the received data, and pass the DDOQ parameters to a DDOQ initialization function. The network services processor 206 maintains base and head/tail pointers for each DDOQ in local memory. The DDOQ identifier is associated to the socket identifier. The host socket module 504 passes this information the host driver 510 which sends it to the network services processor 206. After the DDOQ identifier and the accept confirmation is sent to the network services processor 206 and a response is received, the accept connections are sent to the host socket module 504. The host socket module 504 allocates memory to store the structure for each of the newly accepted connections. The host socket module 504 also allocates a field descriptor for each connection.

At step 920, when the server program issues an accept API call, both network stacks 520, 512 are checked for the availability of a new connection. Once a new connection is available, a new socket descriptor is created and is associated with that particular stack. From this point onwards, at step 924, all the send and receive API calls as well as any other socket API requests are directed to the associated stack by the socket switch module 508.

If the application is a client program and does not specify an address in the bind API call, that is, uses the wild card address, and later at step 926, calls a connect API specifying a non-local (foreign) host address and a port, a decision is made on which stack to use. One or more IP routing tables are consulted to find out which interface could be used to access this foreign address. There may be multiple IP routing tables. There is an IP routing table maintained by the host networking stack, and an IP routing table maintained by each processor networking stack. If the foreign host address is accessible through the host networking stack, the socket descriptor is marked to use it and all the socket send and receive API calls that use that stack and vice versa. There is a possibility that the foreign host address is accessible from multiple or all interfaces, in this case a more intelligent route lookup mechanism is implemented which returns additional information, for example, whether the foreign host address is accessible though a default gateway or if it can be accessed directly through an interface. Even in this case, there is a possibility that all (or multiple) routing tables return the same information back. If this is the case, a decision is made to use a stack.

Once the stack has been selected, at step 928, all the buffered requests along with the connect API are sent to the particular stack. All the subsequent send, receive and other socket API requests are directed to this stack by the socket switch module.

The above case applies to the TCP protocol. The UDP protocol does not have any listening sockets. Thus, the send and receive cases differ from the TCP case that has been described.

For UDP, in the send case, the stack selection is performed based on the IP address specified in the send request as well as the IP routing table because the UDP send operation can only send the datagram through one stack. Once the selection is completed, this socket descriptor always uses the selected stack. In the receive case, the application can receive the datagram from both stacks unless the socket is bound to a particular IP address, in which case, the application only receives the datagram destined for that IP address. In order to achieve this, both stacks are setup to receive any datagram available and later pass it on to the application.

The host socket module 504 maintains a list of all the accepted connections. The socket switch block 508 issues an accept API call to the host socket module 504. The accept API call is not passed to the network services processor 206. Instead a new connection is pushed to the host system 100a when it is available. When the stack in the network services processor 206 accepts new connections, it passes the accepted sockets to the stack socket module 518 in the network services processor 206, which in turn passes them to the core driver 516 in the network services processor 206 along with the associated Direct Data Output Queue (DDOQ) Identifier (ID) 608. The core driver 516 issues a DMA request to send the information of all the newly accepted connections to the host application 102 and returns the number of successful DMA transfers in terms of number of connections.

To transfer data packets on an accepted socket, the application 102 calls the send API. The socket switch block 508 finds the structures corresponding to the socket using the file descriptor. The socket switch block 508 sends the data to the host socket module 504. The host socket module 504 checks the connection state and sends the data to the host driver 510. Data can be transferred by the host driver 510 using zero or non-zero copy.

For non-zero copy send case, the data to be sent is passed to the host driver 510 by the host socket module 504. The host driver 510 copies the data between kernel buffers and application memory, creates a command, puts it in the command queue and indicates to the network services processor 206 that the command is in the queue. In non-blocking case, the control is returned to the application at this point, and application can used select API to check the sent request completion. For a blocking case, the application goes to sleep, waiting for some response from the network service processor 206. Later when the DMA operation is completed, that is, the send command is fetched by the network services processor 206 and an indication is returned that the data fetch is complete, the kernel buffers are freed, and application is notified of the operation completion.

For zero copy send case, the host socket module 504 sends the data and request to the host driver 510. The host driver 510 creates a command, puts it in a command queue. In non-blocking case, the control is returned to the application, and later application uses the select API to check the sent request status. In blocking case, the application waits for the response (goes to sleep while waiting). After the response is received, the number of bytes transferred is sent back to the application 102 through the host socket module 504. The host driver 510 does not free the buffers and the application 102 can reuse these buffers for a subsequent data transfer request.

For non-zero copy receive case, the host application 102 issues a receive API call on an accepted socket to receive data. The socket switch module 508 finds the corresponding socket structure using the file descriptor. The socket switch block 508 calls a receive data function defined by host socket module 504, to receive the data. The receive DDOQ for this socket has already been setup in the accept phase and the socket and the DDOQ association information has already been passed to the stack socket module 518. If the host socket module 504 has data available, it is sent back to the application. If this is not the case, the application 102 waits for the data (goes to sleep) if using the blocking mode. For non-blocking cases, if there is no data available in host socket module 504, the control is returned to application 102 indicating that no data is available. Later, application can use the select API to check the availability of the data.

When the data is available, the host driver 510 calls the DDOQ dispatch function. This function inserts the data in the receive list and also checks if someone is waiting for the data. If a process is waiting, the dispatch function also wakes up the sleeping process.

For the zero-copy receive case, the DDOQ descriptor list is empty. In this case, the application allocates buffers in application space (userspace) to hold the receive data. The host socket module 504 indicates to the network services processor 206 the availability of a new descriptor buffer. The socket structure in the host socket module 504 maintains a list of the receive data pointers for a particular socket. A dispatch function is registered for the host driver while initializing the DDOQ. This indicates to the host socket module 504 the availability of the received data in the DDOQ. Each list includes a head list entry, length flags and pointer to allocated memory. The receive mechanism is based on "push" model. The network services processor networking stack 520 pushes the data to the host 100a when the data is available. The first receive request sent to the stack initiates the push model. Before the receipt of this request, the stack 520 buffers all the available data and does not push it to the host.

The stack 520 always checks that there is descriptor buffer space available before pushing the data. If the space available is more than the data received, all the data will be pushed. If that is not the case the amount of data pushed is dependent on the descriptor buffer space available.

In the zero-copy receive case, the DDOQ is initialized with no descriptor buffers. If the socket module stack 518 has some data available to push, the absence of the descriptor buffers in the DDOQ stops it doing the push operation. When the application is ready to receive, it allocates the receive buffer and calls a function to get the receive data providing a pointer to the receive buffer. The host socket module 504 inserts a new buffer pointer into the DDOQ.

In the zero-copy blocking receive, because of the absence of the descriptor buffers, no data is available when the zero-copy read request is received by the host socket module 504. After performing a descriptor credit operation, the host socket module 504 sends a receive request to the stack socket module 518 and sleeps, waiting for the dispatch function to wake it up and indicate the availability of the received data. When the data is available, the DDOQ dispatch function wakes up the sleeping process. The number of bytes available is sent back to the application 102 along with a pointer to the buffer storing the data.

In the zero-copy non-blocking receive, the buffer is credited, and a receive request is sent to the networking stack 520. The control is returned immediately to the application 102 indicating that no data is available. When the data is available, the stack pushes it to the host descriptor buffers using the DDOQ. The DDOQ dispatch function will eventually transfer it to the host socket module 504. The DMA transfer between the host system and the network services processor will be described later in conjunction with FIGS. 12 and 12. The application can use the select( ) API to query the availability of the received data.

In the non-zero copy case, descriptor buffers in the kernel are already allocated and the DDOQ has been initialized using these buffers. When the data is available, the core driver 516 pushes it to the DDOQ. The host driver calls the registered DDOQ dispatch callback function that indicates to the host socket module 504, the availability of data. The list in the corresponding socket structure is updated and the new data buffers are inserted in the list.

One of the flags field in the socket structure indicates that the connection has been terminated. Network services processor 206 notifies the host socket module 504 when a connection is terminated. Host socket module 204 updates the flags field accordingly. In case of connection termination, if the application 102 tries to read data, the indication of connection termination is sent back using the appropriate error code.

Figure 10:
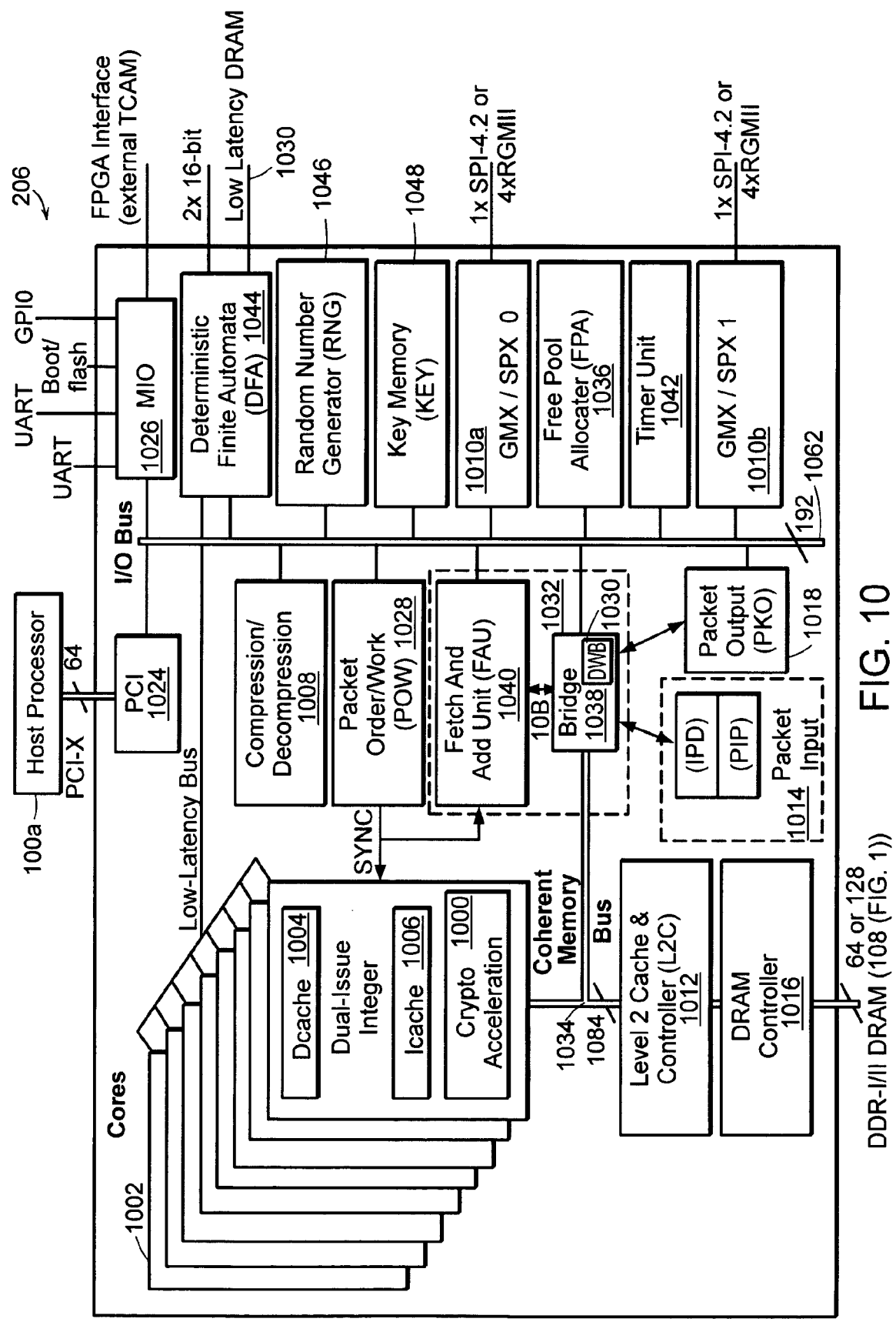
FIG. 10 is a block diagram of the network services processor shown in FIG. 2.

FIG. 10 is a block diagram of the network services processor 206 shown in FIG. 2. The network services processor 206 delivers high application performance using a plurality of processor cores 1002.

In one embodiment, each processor core 1002 is a dual-issue, superscalar processor with instruction cache 1006, Level 1 data cache 1004, and built-in hardware acceleration (crypto acceleration module) 1000 for cryptography algorithms with direct access to low latency memory over the low latency memory bus 1030.

The network services processor 206 includes a memory subsystem. The memory subsystem includes level 1 data cache memory 1004 in each core 1002, instruction cache in each core 1002, level 2 cache memory 1012, a DRAM controller 1016 for access to external DRAM memory 108 (FIG. 1) and an interface 1030 to external low latency memory.

The memory subsystem is architected for multi-core support and tuned to deliver both high-throughput and low-latency required by memory intensive content networking applications. Level 2 cache memory 1012 and external DRAM memory 1008 (FIG. 1) are shared by all of the cores 1002 and I/O co-processor devices over a coherent memory bus 1034. The coherent memory bus 1034 is the communication channel for all memory and I/O transactions between the cores 1002, an I/O Bridge (IOB) 1032 and the Level 2 cache and controller 1012.

Frequently used data values stored in DRAM 408 (FIG. 4) may be replicated for quick access in cache (L1 or L2). The cache stores the contents of frequently accessed locations in DRAM 408 (FIG. 4) and the address in DRAM where the contents are stored. If the cache stores the contents of an address in DRAM requested by a core 1002, there is a "hit" and the data stored in the cache is returned. If not, there is a "miss" and the data is read directly from the address in DRAM 408 (FIG. 4).

A Free Pool Allocator (FPA) 1036 maintains pools of pointers to free memory locations (that is, memory that is not currently used and is available for allocation) in DRAM 408

(FIG. 4). In one embodiment, the FPA unit 1036 implements a bandwidth efficient (Last In First Out (LIFO)) stack for each pool of pointers.

In one embodiment, pointers submitted to the free pools are aligned on a 128 byte boundary and each pointer points to at least 128 bytes of free memory. The free size (number of bytes) of memory can differ in each pool and can also differ within the same pool. In one embodiment, the FPA unit 1036 stores up to 2048 pointers. Each pool uses a programmable portion of these 2048 pointers, so higher priority pools can be allocated a larger amount of free memory. If a pool of pointers is too large to fit in the Free Pool Allocator (FPA) 1036, the Free Pool Allocator (FPA) 1036 builds a tree/list structure in level 2 cache 1012 or DRAM using freed memory in the pool of pointers to store additional pointers.

The I/O Bridge (IOB) 1032 manages the overall protocol and arbitration and provides coherent I/O partitioning. The IOB 1032 includes a bridge 1038 and a Fetch and Add Unit (FAU) 1040. The bridge 1038 includes queues for storing information to be transferred between the I/O bus 1062, coherent memory bus 1034, and the IO units including the packet input unit 1014 and the packet output unit 1018. The bridge 1038 also includes a Don't Write Back (DWB) engine 1060 that monitors requests to free memory in order to avoid unnecessary cache updates to DRAM 408 (FIG. 4) when cache blocks are no longer required (that is, the buffers in memory are freed) by adding them to a free pool in the FPA unit 1036. Prior to describing the operation of the bridge 1038 in further detail, the IO units coupled to the IO bus 1062 in the network services processor 206 will be described.

Packet Input/Output processing is performed by an interface unit 1010a, 1010b, a packet input unit (Packet Input) 1014 and a packet output unit (PKO) 1018. The input controller and interface units 1010a, 1010b perform all parsing of received packets and checking of results to offload the cores 1002.

The packet input unit 1014 allocates and creates a work queue entry for each packet. This work queue entry includes a pointer to one or more buffers (blocks) stored in L2 cache 1012 or DRAM 408 (FIG. 4). The packet input unit 1014 writes packet data into buffers in Level 2 cache 1012 or DRAM 408 in a format that is convenient to higher-layer software executed in at least one processor core 1002 for further processing of higher level network protocols. The packet input unit 1014 supports a programmable buffer size and can distribute packet data across multiple buffers in DRAM 408 (FIG. 4) to support large packet input sizes.

A packet (datagram) is received by any one of the interface units 1010a, 1010b through a SPI-4.2 or RGM II interface. A packet can also be received by the PCI interface 1024. The interface unit 1010a, 1010b handles L2 network protocol pre-processing of the received packet by checking various fields in the L2 network protocol header included in the received packet. After the interface unit 1010a, 1010b has performed L2 network protocol processing, the packet is forwarded to the packet input unit 1014. The packet input unit 1014 performs pre-processing of L3 and L4 network protocol headers included in the received packet. The pre-processing includes checksum checks for Transmission Control Protocol (TCP)/User Datagram Protocol (UDP) (L3 network protocols).

The Packet order/work (POW) module (unit) 1028 queues and schedules work (packet processing operations) for the processor cores 1002. Work is defined to be any task to be performed by a core that is identified by an entry on a work queue. The task can include packet processing operations, for example, packet processing operations for L4-L7 layers to be performed on a received packet identified by a work queue entry on a work queue. The POW module 1028 selects (i.e., schedules) work for a core 1002 and returns a pointer to the work queue entry that describes the work to the core 1002.

After the packet has been processed by the cores 1002, a packet output unit (PKO) 1018 reads the packet data stored in L2 cache 1012 or memory (DRAM 408 (FIG. 4)), performs L4 network protocol post-processing (e.g., generates a TCP/UDP checksum), forwards the packet through the interface unit 1010a, 1010b and frees the L2 cache 1012 or DRAM 408 locations used to store the packet by adding pointers to the locations in a pool in the FPA unit 1036.

The network services processor 206 also includes application specific co-processors that offload the cores 1002 so that the network services processor achieves high-throughput. The application specific co-processors include a DFA co-processor 1044 that performs Deterministic Finite Automata (DFA) and a compression/decompression co-processor 1008 that performs compression and decompression.

The Fetch and Add Unit (FAU) 1040 is a 2KB register file supporting read, write, atomic fetch-and-add, and atomic update operations. The PCI interface controller 1024 has a DMA engine that allows the processor cores 1002 to move data asynchronously between local memory in the network services processor and remote (PCI) memory in the host in both directions according to the principles of the present invention.

As shown in FIG. 10, the network services processor includes a plurality of cores 1002, one of which can be dedicated to executing an operating system that includes the socket modules described in conjunction with FIG. 5.

Figure 11:
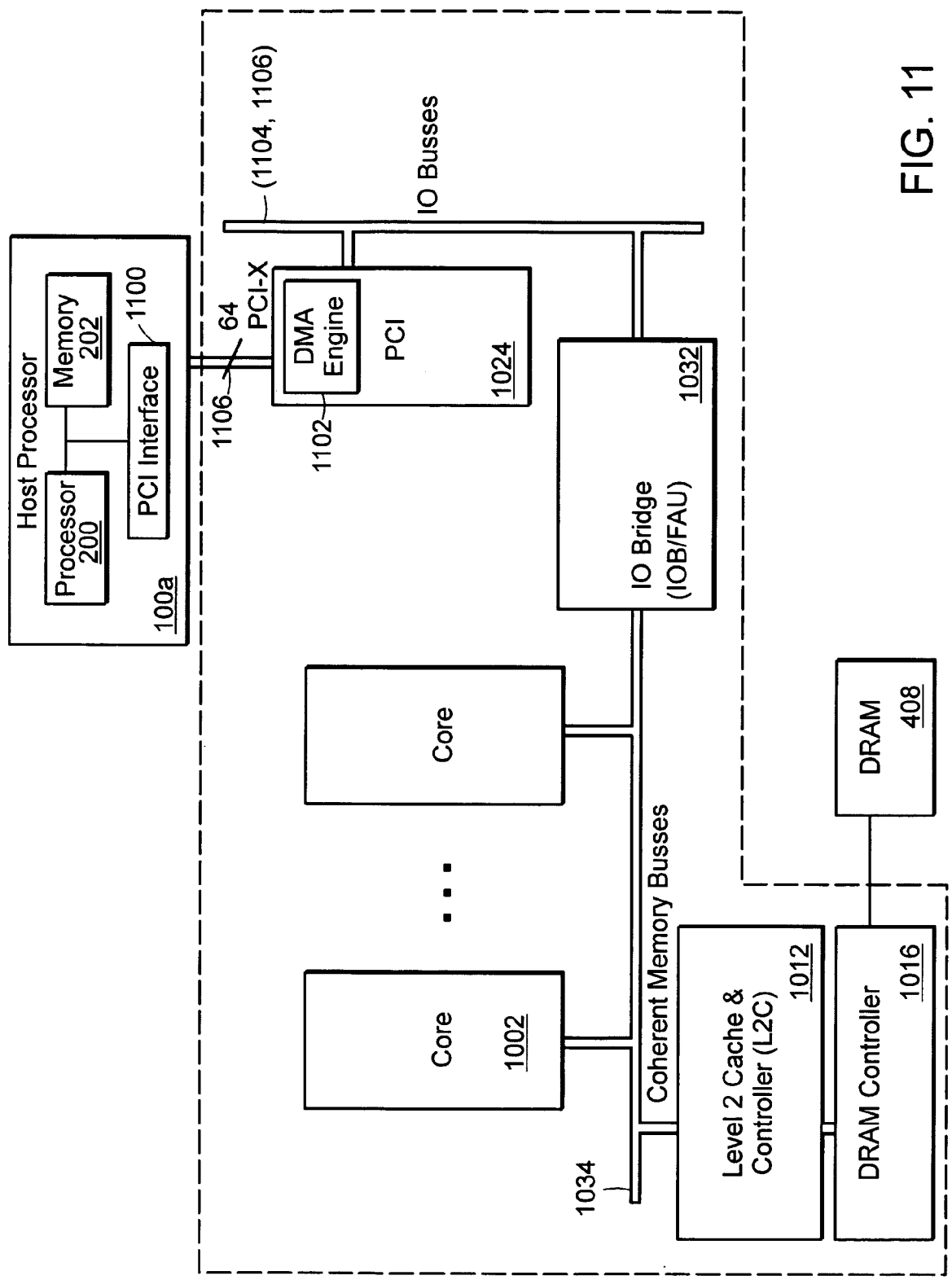
FIG. 11 is a block diagram illustrating the cores, PCI interface and IO Bridge shown in FIG. 10.

FIG. 11 is a block diagram illustrating the cores, PCI interface and IO Bridge shown in FIG. 10. A core 1002 can initiate a Direct Memory Access (DMA) operation to asynchronously transfer data between in L2 cache 1012 or external DRAM 408 and remote memory, that is, memory in a host system coupled to the PCI bus 1106.

The PCI interface controller 1024 has a DMA engine 1102 that allows the cores 1002 to move data asynchronously between local memory 1012, 408 and remote (PCI) host memory in the host system 100a in both directions. The DMA engine 1102 can be used to support per-flow queuing in PCI host memory. The DMA engine transfers data between local memory and memory on the host side of the PCI bus and updates a control queue on the host side.

A processor (core) can move data asynchronously between local (DRAM) memory and remote (PCI) memory in the host system by submitting PCI DMA instructions to the PCI DMA engine in the PCI Interface controller 1024. The instruction to initiate the DMA operation enters a write buffer in the core 1002, is reflected across the coherent memory bus 1034, sent through the IO bridge (IOB)/FAU 232, onto the IO bus 1104, and enters the PCI interface module 1024. The direction of transfer of the data that is, to memory in the host system (outbound) or from memory in the host system (inbound) can be indicated in the PCI DMA instruction executed by a DMA engine 1102 in the PCI interface module 1024. In one embodiment the PCI interface module 1024 has two DMA engines 1102.

Figure 12:
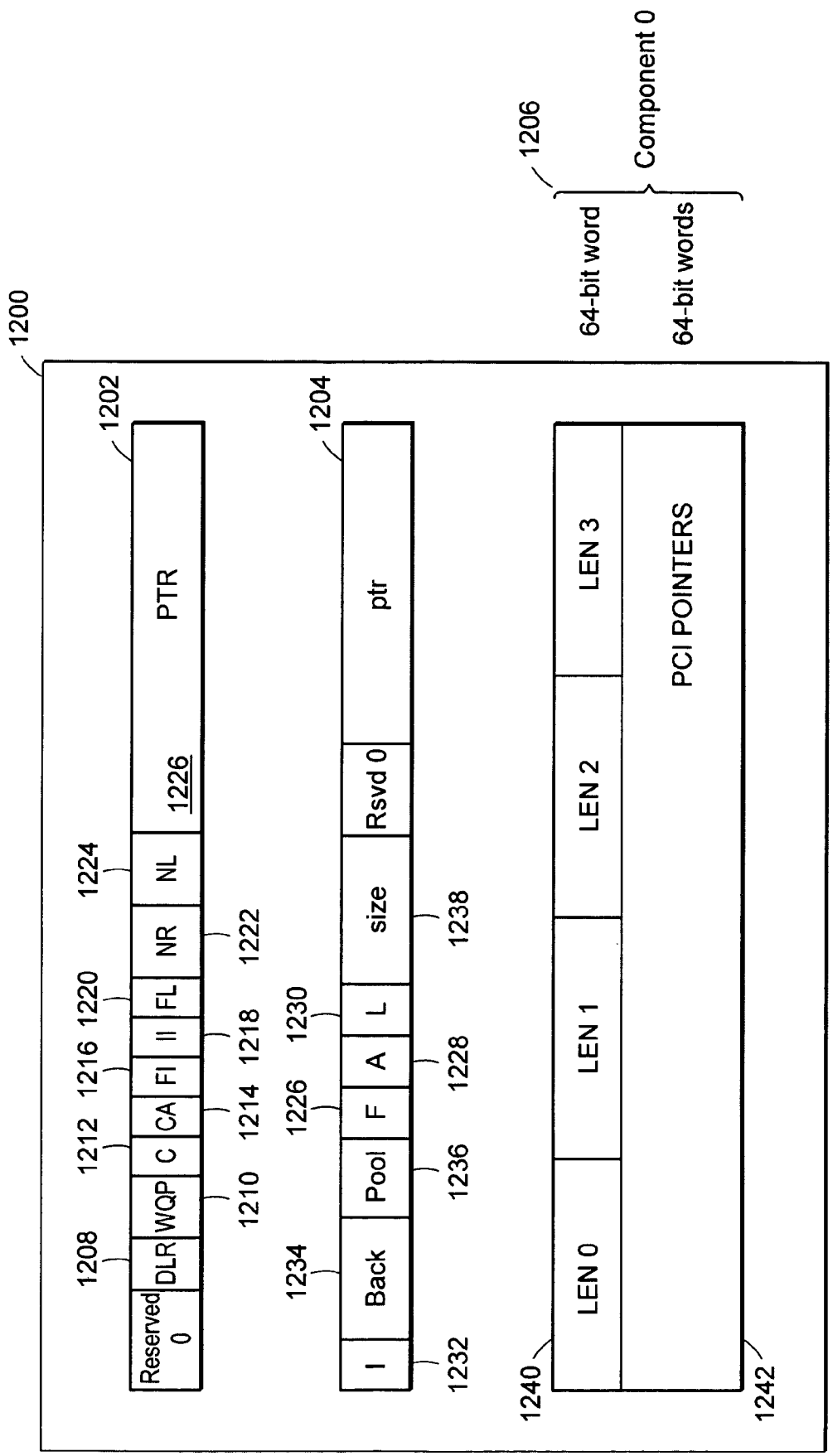
FIG. 12 illustrates the format of a PCI DMA instruction that specifies the type of DMA operation to be performed by one of the DMA engines in the PCI interface shown in FIG. 11.

FIG. 12 illustrates the format of a PCI DMA instruction 1200 sent by a core to the DMA engine 1102 that specifies the type of DMA operation to be performed by one of the DMA engines 1102 in the PCI interface 1024 shown in FIG. 11. The PCI DMA instruction 1200 includes a DMA HDR 1202, one or more local pointers 1204 and one or more PCI Components 1206. In one embodiment, a PCI DMA instruction can have from 4-32 (64-bit words). A single PCI DMA instruction may be either be stored in contiguous memory or split into two pieces, dependent on how it is stored in a PCI DMA instruction chunk. The PCI DMA instruction chunk will be described later in conjunction with FIG. 13.

The DMA HDR 1202 describes the PCI DMA operation to be performed. The DIR field 1208 indicates whether the PCI DMA transfer is inbound (store into local memory) or outbound (store into PCI memory space (host memory)). The WPQ field 1210 indicates what is stored in the PTR field 1226. The C field 1212 indicates whether counter 1 or counter 2 is to be used. The CA field 1214 indicates whether the selected counter is to be updated after the PCI DMA instruction 1200 is complete. The FI field 1216 indicates whether a force interrupt-bit is set after the PCI DMA instruction 1200 is complete. The II field 1218 indicates whether the buffers in local memory are to be freed. The FL field 1216 indicates whether for an outbound operation, the associated memory buffer in host memory is freed after the local memory is read. The NR field 1222 stores the number of PCI pointers in the PCI DMA instruction 1200. The NL field 1224 stores the number of Local pointers in the instruction 1200. The PTR field 1226 stores a work queue entry pointer or a local memory pointer dependent on the state of the WQP field. When the PTR 1226 stores a work queue entry pointer the work queue entry indicated by the PTR field 1226 is inserted into the work queue after the PCI DMA operation is complete. When the PTR field 1226 stores a local memory pointer, the single byte in local memory indicated by the PTR is set to zero after the PCI DMA operation is complete. When the pointer is zero, no operation is performed after the PCI operation is complete. An outbound transfer completes after the last PCI write transaction appears on the PCI bus. An inbound transfer completes only after all its local memory stores commit.

The local pointer 1204 describes a memory fragment in the local memory 408, 1012. The number of pointers is set by the NL bit 1224. The F field 1226 indicates whether full block writes are allowed; The A field 1228 indicates whether cache blocks should be allocated in L2 cache; The L field 1230 indicates whether the data stored in the location identified by the pointer is in little endian format; The I 1232, Back 1234 and pool fields 1236 are only used if the associated local memory buffer is freed, which can only happen in the outbound case. The I field 1232 indicates whether buffers can be freed independently. The Back field 1234 specifies the amount to subtract from the pointer to reach the start of the buffer. The pool field 1236 selects a free list to return the block to. The size field 1238 specifies the size of the contiguous space pointed at by ptr (in bytes). The ptr specifies the location in local memory 408,1012 where the start of the packet is stored.

The PCI component 1206 is a compressed list of PCI memory space pointers and their associated lengths. Up to 4 lengths are encoded in a length word. A component is a length word 1240 and its associated pointers 1242. A typical component 1206 is 5 words, one word 1240 stores the length of each PCI memory space pointer and each of the next four words 1242 store a PCI memory space pointer. In a system with a word size of 64-bits, each PCI pointer 1242 is 64-bits. Together with a length, the PCI pointer describes a fragment in PCI memory space. The pointer format is identical to the DPTR format defined above for the PCI input instructions.

As previously discussed, in one embodiment, the PCI interface includes two DMA engines 1102 (FIG. 11) that service PCI DMA instructions that are stored in two queues. At any time, the PCI DMA instructions 1200 are selected from one of the two queues at a fixed priority. If two outbound instructions use the same queue, the writes for the two instructions appear on the PCI bus in the order that the instructions were queued. PCI DMA instructions are added at the head of a queue and a doorbell register is written to indicate the arrival of an instruction for the corresponding queue (typically with the number of words in the PCI DMA instructions in a chunk). The doorbell writes are accumulated and when read from the tail of the queue, the PCI DMA operation is performed. When the chunk at the tail of the instruction output queue is exhausted, that is, all the instructions that filled the chunk have been read, the tail chunk is freed and the instructions are read from the next chunk on the queue.

Figure 13:
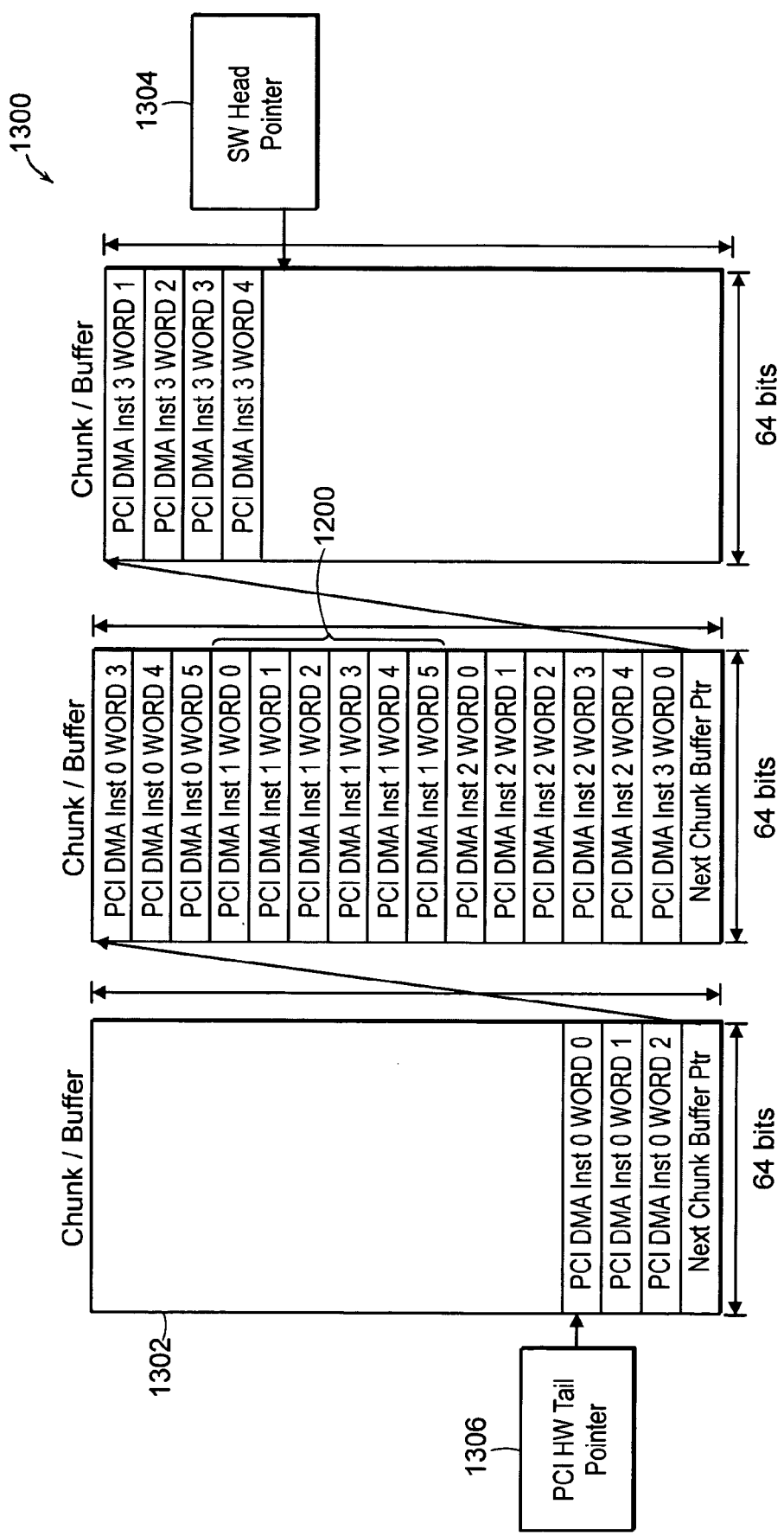
FIG. 13 illustrates a PCI DMA instruction queue that includes a linked list of memory chunks.

FIG. 13 illustrates a PCI DMA instruction queue 1300 that includes a linked list of memory chunks 1302. Instructions are read and written contiguously in a chunk 1302, starting at the first word. A given PCI DMA instruction 1200 is normally contiguous in local DRAM memory, but a single instruction spans two chunks if the contiguous words in the instruction would otherwise over-run the next pointer of the chunk. In this case, the remainder of the instruction resides at the beginning of the next chunk. The next chunk is allocated and the next pointer of the previous chunk is updated whenever an instruction is inserted into the queue that abuts or overruns the next chunk buffer pointer. This allows the next pointer to be read and the next chunk to be traversed with the same fetch used to read the last instruction word of the chunk.

In one embodiment, each host queue (DDOQ) is implemented as a ring buffer. A ring buffer is a fixed size memory in which data is written consecutively from the start to the end of the buffer. When the end of the buffer is reached, data is once again written to the start of the buffer overwriting previously written data. Other queue/buffer structures are possible in other embodiments. Each host queue has a head pointer 1304, tail pointer 1306 and outstanding doorbell count which are stored in L2 cache 1012 or external DRAM 408. The host software issues a doorbell ring by submitting a work queue entry with a pointer to the packet stored in host memory to indicate space availability.

The doorbell count (that is, the distance between the head and tail pointers) indicates when there are words to be fetched from the queue. Multiple instructions may be launched with a single doorbell write and multiple doorbell writes can be used to announce the availability of a single instruction.

For an outbound transfer (to the host system), the doorbell counter is not incremented and interrupts are not set until the last PCI write for a chunk appears on the PCI bus. For an inbound transfer (from the host system), the order of local memory stores is not guaranteed. However, all memory stores are complete/committed before the instruction completes. Memory read or Memory read multiple commands are created to service an inbound DMA request, and Memory write commands are created to service outbound DMA transfers.

For the packet output queues, the door bell ring is a direct PCI command/status register in the PCI interface 1024 that is written by the host processor over the PCI bus. For the host queues, the doorbell ring is a special work queue entry or packet received from the host. The host processor can create/submit the special work queue entry or packet accomplishing the "doorbell ring" via a PCI instruction issued over the PCI bus. Two additional rings are provided for control purposes. The base and head/tail pointers for the control rings are also maintained in L1 cache or external DRAM and "doorbell rings" for the control rings are also received via a PCI instruction.

To set up a DMA outbound transfer, that is, to send a packet to the host system, a PCI DMA instruction 1200 is created. To create the PCI DMA instruction, PCI DMA local pointers and PCI DMA host pointers (PCI components) are selected to transfer the packet data from local memory 408, 1012 into the host memory. Additional PCI DMA local pointers and PCI DMA host pointers (PCI components) to the lists are appended to transfer the control packet into the host memory after the packet data. The packet data is written to an appropriate host memory ring and a control packet is written to one of the two available control rings. The control packet includes ring identifier 626 (FIG. 6) and packet size fields 616 (FIG. 6) and is the indication to the host system that packet data arrived at the identified ring. Both the packet and the control packet can be transferred to the host memory via a single outbound PCI DMA instruction.

The base and head/tail pointers maintained in L2/DRAM determine the locations where both the packet data and the control packet data are placed in the host memory. These addresses are supplied in the PCI DMA Instruction PCI components for the outbound transfer. The CA-bit in the PCI DMA instruction header is set to indicate the arrival of the control packet and the C-bit is set to identify which of the two control queues was used.

Thus, many simultaneous host queues can be handled. In one embodiment, up to one million host queues are handled simultaneously with each host queue implemented as a single ring. The network services processor maintains base and head/tail pointers to the one million host queues, the base and head/tail pointers for each of the two control queues are also maintained in local memory associated with the network services processor.

Processing time is further reduced by reducing the number of interrupts. An interrupt is only generated after n data has been transferred. For example, after five entries have been added to the queue. The interrupt is serviced by checking the entries on the queue, taking the entries from the queue and scheduling processors to handle the entries on the queue.

Figure 14:
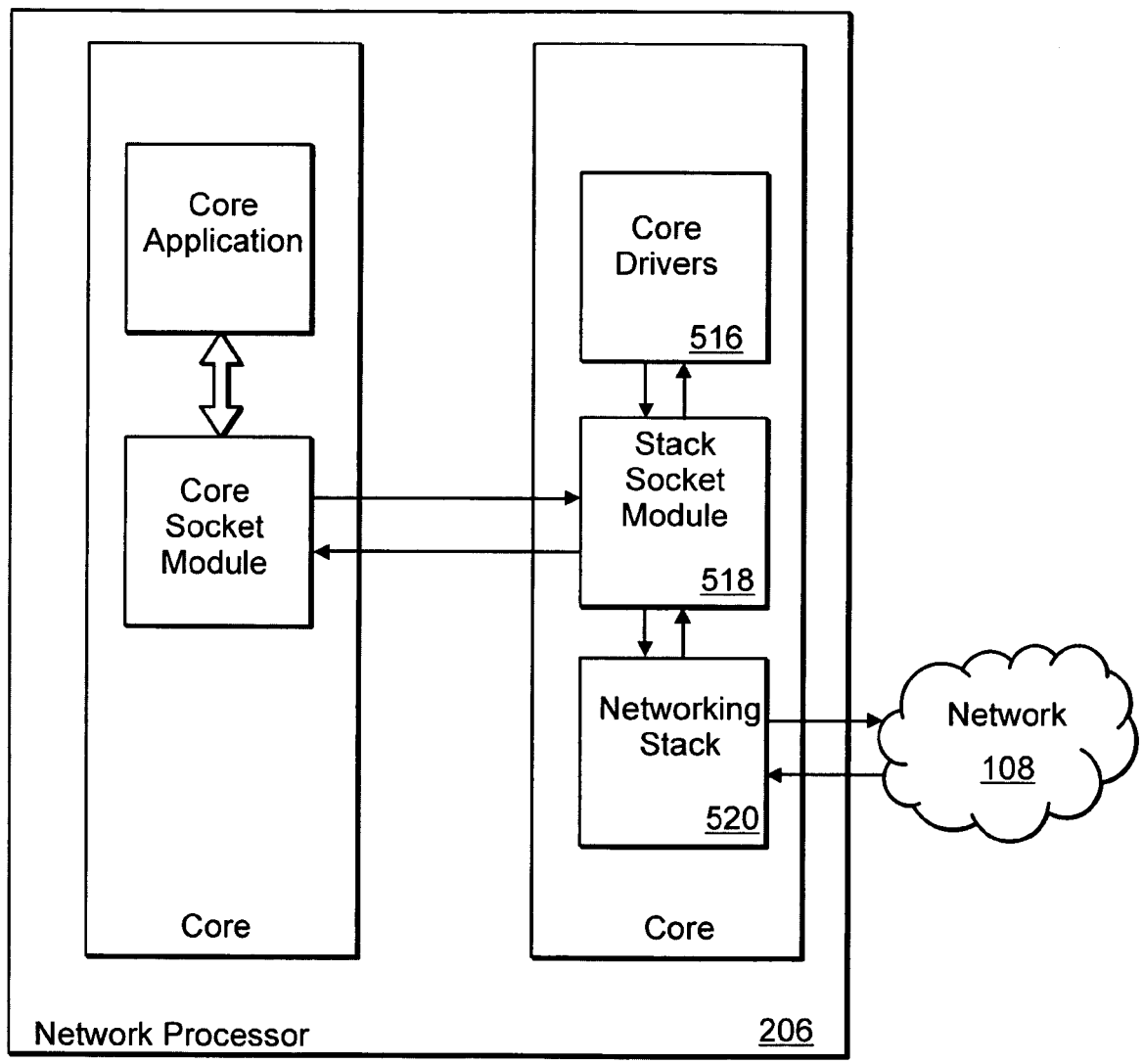
FIG. 14 is a block diagram illustrating software modules in cores, one of which is dedicated to executing an operating system.

FIG. 14 is a block diagram illustrating software modules in cores, one of which is dedicated to executing an operating system. The application executing on the core uses the host socket APIs to access the socket interface on another core. The host application uses the host socket module and host driver to access the networking stack when the operating system is running on a core these modules are replaced by a modified core socket module.

Core to core transfer has a similar API interface from the software point of view but there is no DMA engine to transfer data. Instead the TCP stack side cores act as a DMA engine and move data from the TCP connection buffers to application buffers. The other data structures are similar except that notification is sent via core-to-core communication mechanism, for example through Inter Processor Communication (IPC) or an interrupt.

To provide the zero-copy mechanism, an application running in a core allocates buffers from the zero-copy pool. Buffers are allocated and returned by the networking stack in the core.

While this invention has been particularly shown and described with references to preferred embodiments thereof, it will be understood by those skilled in the art that various changes in form and details may be made therein without departing from the scope of the invention encompassed by the appended claims.

What is claimed is:

1. A network processor comprising:
a host system with a bus interface; and
a Network Interface Card (NIC) capable of handling multiple network protocols;
the NIC managing a queue system for sockets established between an application executing in host application memory and another application executing in a remote host coupled to a network, the NIC terminating network protocols on behalf of the host system and reducing overhead data copy in a kernel by transferring data asynchronously directly to the host application memory, the queue system storing a unique identifier for a process identifier associated with each corresponding socket, the kernel informing a waiting process in the host system that data has been written to the host application memory based on the process identifier stored in the queue system.

2. The network processor of claim 1, wherein the sockets include a Transmission Control Protocol socket.

3. The network processor of claim 1, wherein the sockets include a User Datagram Protocol socket.

4. The network processor of claim 1, wherein data transferred over the network is transferred directly between local memory and application space in host memory in the host system.

5. The network processor of claim 1, wherein the queue system includes a ring buffer and address pointers for managing the queue system are stored in local memory.

6. A computer implemented method for transferring data between an application executing in a host system and a remote application executing in a remote host system over a socket, the method comprising:
sharing by a plurality of processors a local memory for storing data transferred over a network;
managing a per flow queue for a socket connection established between the application executing in host application memory and the remote application executing in the remote host system coupled to the network, storing a unique identifier for a process identifier associated with the socket in a global queue; and
reducing overhead of data copy by transferring data asynchronously directly between the host application memory and local memory, an indication being received by a kernel in the host system indicating that data has been written to application memory using the global queue, the indication being sent to a waiting process by the kernel based on a process identifier stored in the global queue.

7. The method of claim 6, wherein the socket is a Transmission Control Protocol socket.

8. The method of claim 6, wherein the socket is a User Datagram Protocol socket.

9. The method of claim 6, wherein data transferred over the network is transferred directly between local memory and application space in host memory in the host system.

10. The method of claim 6, wherein the queues are implemented as a ring buffer and address pointers for managing the queues are stored in local memory.

11. A network processor comprising:
local memory shared by the plurality of processors for storing data transferred over a network coupled to the network processor; and
interface means for managing a queue system in host memory for a socket established between an application executing in the host application memory in a host system and a remote application executing in a remote host system coupled to the network, a global queue storing a unique identifier for a process identifier associated with the socket, the interface means transferring data asynchronously directly between the host application memory and local memory to reduce overhead of data copy, an indication being received by a waiting process kernel in the host system indicating that data has been written to the host application memory based on a process identifier stored in the global queue, and the kernel directly informing a waiting process that data are available based on the process identifier.

12. A network processor system comprising:

a plurality of processors, a first processor executing an application and a second processor executing an operating system; and a local memory shared by the plurality of processors for handling network protocols and storing data transferred over a network coupled to the network processor system, the second processor managing a per flow queue for a socket established between the application and another application executing in a remote host coupled to the network, a global queue storing a unique identifier for the socket, the data being transferred directly between the application buffers and network buffers in the local memory to reduce overhead of data copy.

13. A networking system comprising:

a host system executing a network application, the host system comprising:

a host networking stack;

a processor networking stack;

a network interface card (NIC) capable of handling multiple network protocols; and a socket switch, the socket switch directing network service calls from the application through the host networking stack or the processor networking stack to the NIC based on an Internet Protocol address included in a network service call, the NIC terminating network protocols on behalf of the host system and reducing overhead data copy in a kernel by transferring data asynchronously directly to the host application memory.

* * * * *

UNITED STATES PATENT AND TRADEMARK OFFICE
CERTIFICATE OF CORRECTION

PATENT NO. : 7,613,813 B2　　　　　　　　　　　　　　　　　　　　　　　　Page 1 of 1
APPLICATION NO. : 11/225373
DATED : November 3, 2009
INVENTOR(S) : Hussain et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1059 days.

Signed and Sealed this

Nineteenth Day of October, 2010

David J. Kappos
*Director of the United States Patent and Trademark Office*